(12) United States Patent
Valle

(10) Patent No.: US 9,550,547 B2
(45) Date of Patent: Jan. 24, 2017

(54) ASSEMBLY OF TOOTHED WHEELS FOR A BICYCLE

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 1430 days.

(21) Appl. No.: 12/187,577

(22) Filed: Aug. 7, 2008

(65) Prior Publication Data

US 2009/0042679 A1 Feb. 12, 2009

(30) Foreign Application Priority Data

Aug. 9, 2007 (IT) .............................. MI2007A1661

(51) Int. Cl.
*B62M 9/10* (2006.01)
*B62M 9/12* (2006.01)

(52) U.S. Cl.
CPC .............. *B62M 9/10* (2013.01); *B62M 9/105* (2013.01); *B62M 9/12* (2013.01)

(58) Field of Classification Search
CPC ............ B62M 9/00; B62M 9/04; B62M 9/06; B62M 9/10; B62M 9/105; B62M 9/12
USPC .... 474/152–160, 161, 164; 301/110.5, 124.2
See application file for complete search history.

(56) References Cited

U.S. PATENT DOCUMENTS

| | | | |
|---|---|---|---|
| 3,082,637 A | | 3/1963 | Paxton |
| 4,296,850 A | * | 10/1981 | Isobe .............................. 192/64 |
| 4,363,580 A | * | 12/1982 | Bell ................................. 411/15 |
| 4,869,710 A | * | 9/1989 | Iwasaki ......................... 474/160 |
| 5,026,329 A | | 6/1991 | Diekevers |
| 5,766,106 A | | 6/1998 | Edwards |
| 5,935,034 A | | 8/1999 | Campagnolo |
| 5,954,604 A | | 9/1999 | Nakamura |
| 6,039,665 A | | 3/2000 | Nakamura |
| 6,102,281 A | | 8/2000 | Lafferty et al. |
| 6,176,798 B1 | | 1/2001 | Nakamura |

(Continued)

FOREIGN PATENT DOCUMENTS

| | | |
|---|---|---|
| DE | 4401272 | 3/1995 |
| DE | 29623258 U1 | 3/1998 |

(Continued)

OTHER PUBLICATIONS

European Search Report, Appl. No. EP 08005991.8, dated Mar. 6, 2009.

(Continued)

*Primary Examiner* — Sang Kim
*Assistant Examiner* — Juan Campos, Jr.
(74) *Attorney, Agent, or Firm* — Volpe and Koenig, P.C.

(57) ABSTRACT

An assembly of toothed wheels of a bicycle has at least two toothed wheels of different diameter and at least one support member of at least one toothed wheel of the at least two toothed wheels on a component of a bicycle, like for example a free body of a hub for a rear bicycle wheel. The at least one support member is at least partially housed in at least one cavity of at least one other toothed wheel of the at least two toothed wheels. In this way, the distance between the toothed wheels is lower than the thickness of the support member of the toothed wheels themselves. The support member can thus maintain a strong resistant section at the attachment area to the respective toothed wheel. At the same time, it is possible to mount a greater number of sprockets on a free body of standard size.

62 Claims, 17 Drawing Sheets

(56) References Cited

U.S. PATENT DOCUMENTS

Figure 1:
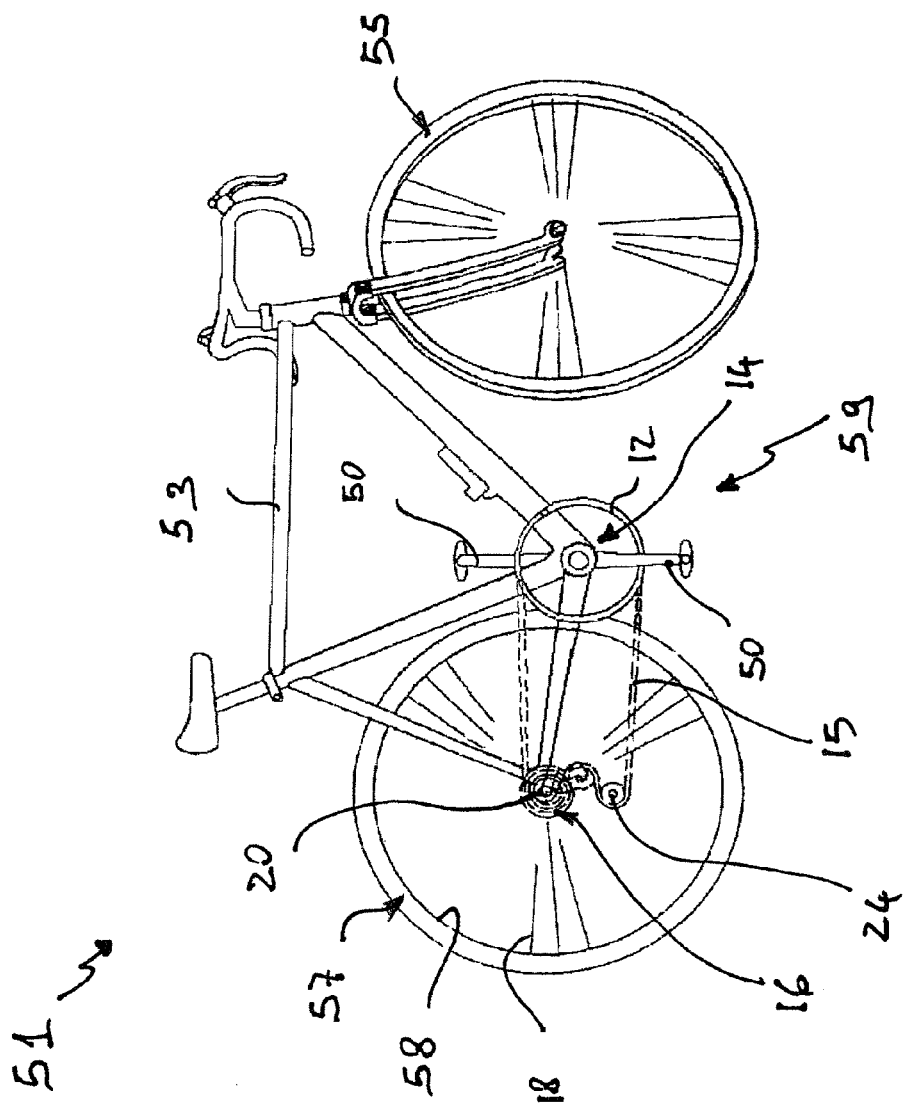

| | | | |
|---|---|---|---|
| 6,382,381 B1* | 5/2002 | Okajima et al. | 192/64 |
| 6,428,437 B1 | 8/2002 | Schlanger | |
| 7,344,463 B2 | 3/2008 | Reiter | |
| 7,854,673 B2 | 12/2010 | Oseto et al. | |
| 7,871,347 B2 | 1/2011 | Kamada | |
| 7,931,553 B2* | 4/2011 | Tokuyama | 474/160 |
| 8,057,338 B2 | 11/2011 | Kamada | |
| 2004/0070166 A1 | 4/2004 | Valle | |
| 2004/0121867 A1* | 6/2004 | Reiter | 474/160 |
| 2005/0272546 A1* | 12/2005 | Reiter | 474/152 |
| 2005/0282672 A1 | 12/2005 | Nonoshita | |
| 2006/0063624 A1 | 3/2006 | Voss | |
| 2006/0172840 A1* | 8/2006 | Kamada | 474/152 |
| 2006/0231366 A1 | 10/2006 | Meggiolan | |
| 2006/0258499 A1 | 11/2006 | Kamada | |
| 2007/0129193 A1 | 6/2007 | Nonoshita et al. | |
| 2008/0004143 A1* | 1/2008 | Kanehisa et al. | 474/160 |
| 2008/0058144 A1 | 3/2008 | Oseto | |
| 2008/0188336 A1* | 8/2008 | Tokuyama | 474/160 |
| 2009/0042680 A1* | 2/2009 | Valle | 474/160 |
| 2009/0042681 A1* | 2/2009 | Dal Pra' et al. | 474/160 |
| 2009/0042682 A1* | 2/2009 | Dal Pra' et al. | 474/160 |
| 2009/0098966 A1* | 4/2009 | Kamada | 474/160 |
| 2010/0009794 A1* | 1/2010 | Chiang | 474/160 |
| 2011/0092327 A1 | 4/2011 | Oishi | |
| 2012/0196711 A1* | 8/2012 | Loy et al. | 474/160 |
| 2013/0049444 A1* | 2/2013 | Kitamura | 301/110.5 |
| 2013/0049445 A1* | 2/2013 | Kitamura | 301/110.5 |
| 2013/0049446 A1* | 2/2013 | Kitamura | 301/110.5 |
| 2013/0049447 A1* | 2/2013 | Kitamura | 301/110.5 |
| 2013/0049448 A1* | 2/2013 | Kitamura | 301/110.5 |

FOREIGN PATENT DOCUMENTS

| | | |
|---|---|---|
| DE | 202004019270 | 4/2005 |
| DE | 102007010456 | 12/2007 |
| DE | 19629602 A1 | 4/2012 |
| EP | 0012568 | 6/1980 |
| EP | 0510371 A1 | 10/1992 |
| EP | 0561380 A1 | 9/1993 |
| EP | 0765802 | 4/1997 |
| EP | 0849155 A2 | 6/1998 |
| EP | 1043221 | 10/2000 |
| EP | 1422134 A2 | 5/2004 |
| EP | 1431172 | 6/2004 |
| EP | 1688345 | 8/2006 |
| EP | 1721823 A2 | 11/2006 |
| EP | 2022713 | 2/2009 |
| FR | 910359 | 6/1946 |
| FR | 989114 | 9/1951 |
| JP | 04297390 | 10/1992 |
| JP | 10181668 | 7/1998 |
| JP | 10181669 | 7/1998 |
| JP | 2004131077 | 4/2004 |
| JP | 2006007799 | 1/2006 |
| TW | 171676 | 10/1991 |
| TW | 273218 | 3/1996 |
| TW | 590955 | 6/2004 |
| TW | I289517 B | 11/2007 |

OTHER PUBLICATIONS

European Search Report, Appl. No. EP 08005988.4, dated Mar. 3, 2009.
European Search Report, Appl. No. EP 08005988.4, dated Jul. 24, 2009.
Japanese Office Action for Application No. 2008-205211 issued Jan. 8, 2013 with English Translation.
European Search Report, Appln. No. EP 08005989.2-1254/2022713, dated Mar. 28, 2012.
Taiwanese Office Action and Search Report issued Dec. 16, 2013 in corresponding TW Patent Application No. 097129116.
Chinese Office Action and English translation issued Jan. 18, 2012.

* cited by examiner

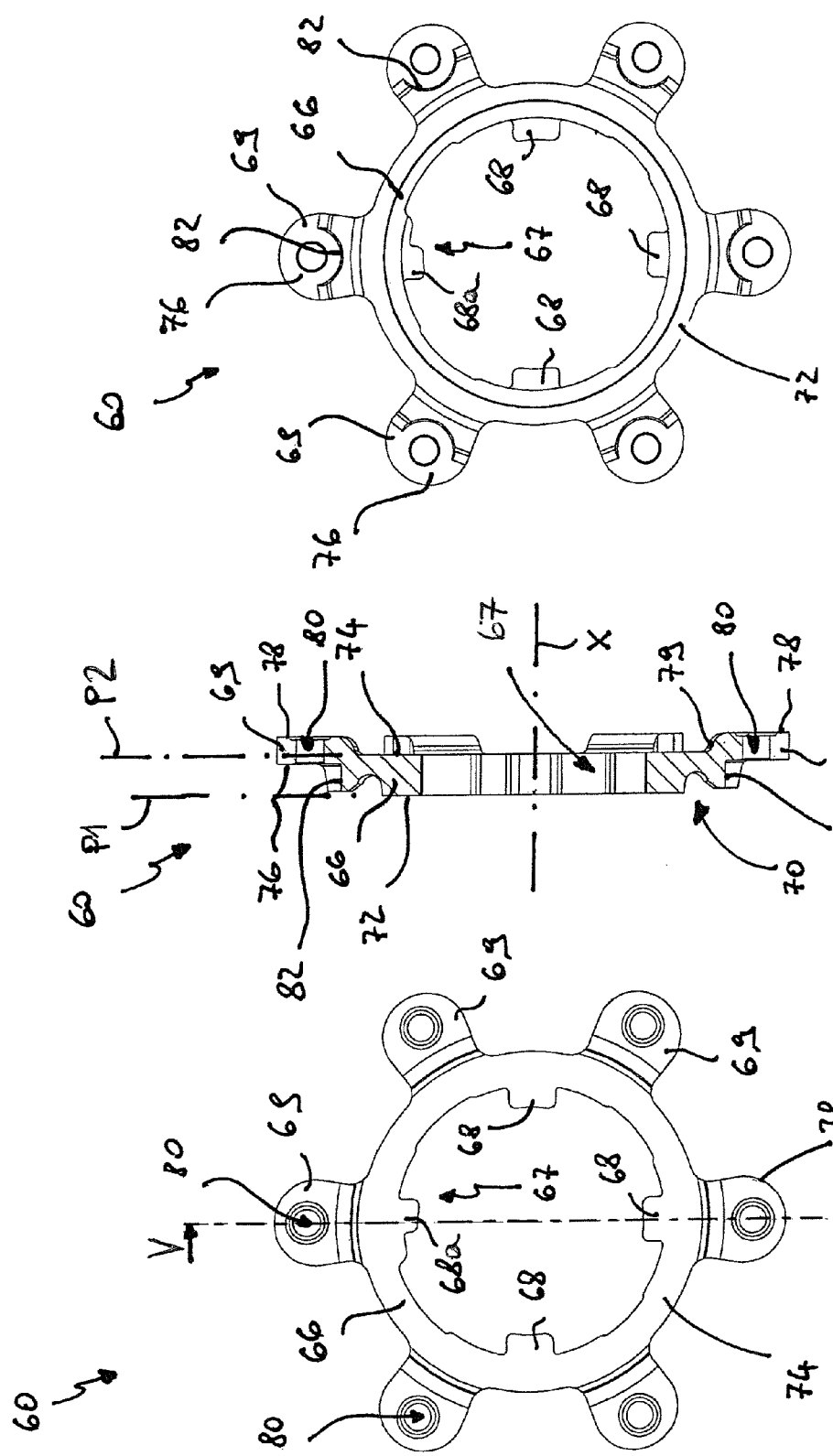

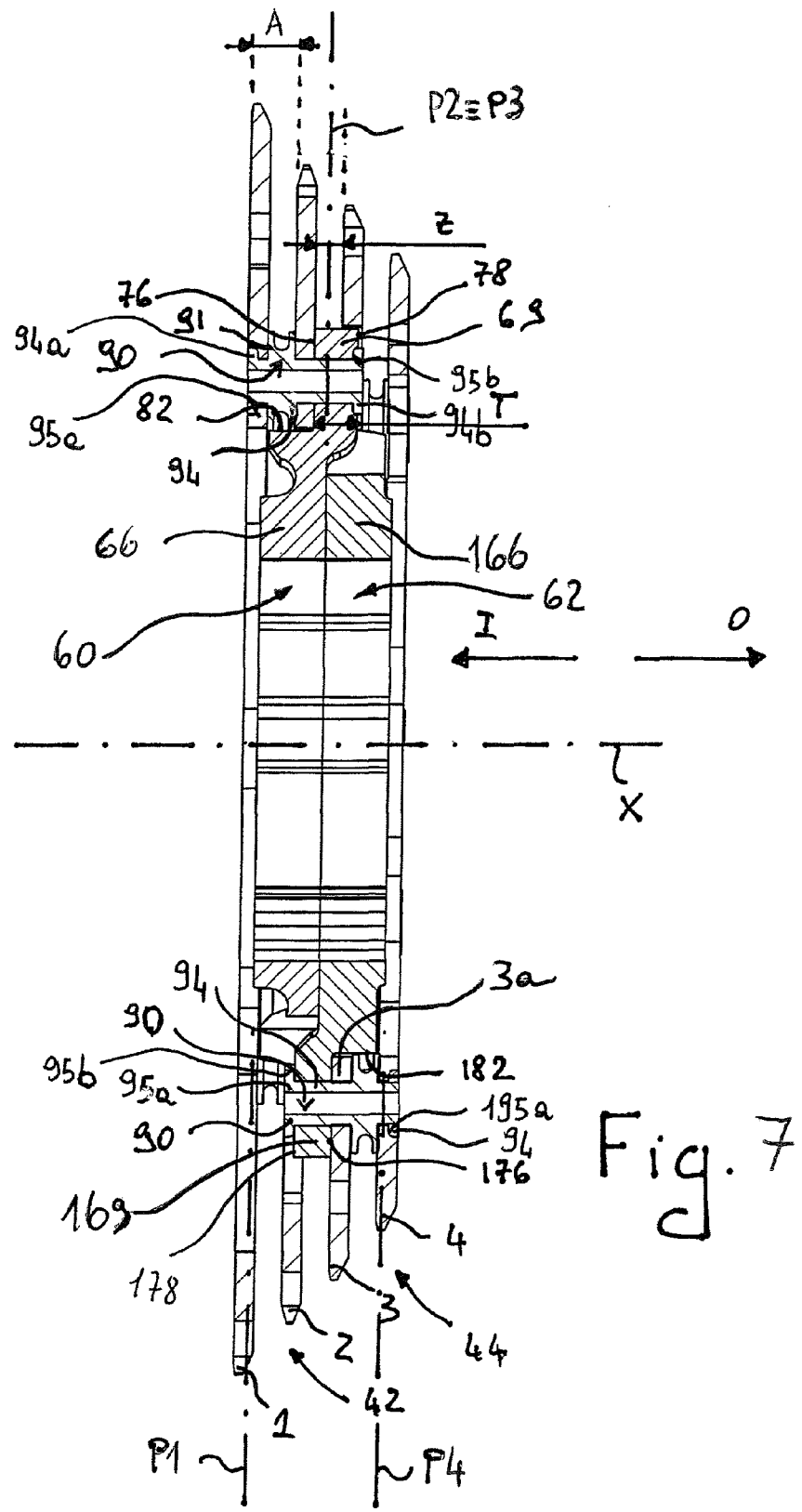

ASSEMBLY OF TOOTHED WHEELS FOR A BICYCLE

FIELD OF INVENTION

The present invention relates to an assembly of toothed wheels of a bicycle.

BACKGROUND

Sprockets are coupled with a rear wheel of a bicycle through a hub. This comprises a first body, rigidly fixed to the rim of the bicycle through spokes, and a second body, rigidly coupled with the sprockets and able to rotate freely with respect to the first body in a direction of rotation, and to make it rotate in the opposite direction, thus giving the rear driving wheel its forward motion. In the technical jargon, this second body is called "free body."

Since a bicycle is a means of transport using muscular propulsion, there is a general requirement for the power transmission system from the cyclist to the driving wheel to allow the least tiring possible.

As known, the combination of a guide toothed wheel with a small diameter with a sprocket with a large diameter allows demanding climbs to be ably handled. However, this same combination, over flat land or going downhill, is disadvantageous since the cyclists energy is dissipated, due to the fact that the cyclist is obliged to pedal quickly while the bicycle moves forwards slowly.

In order to make the aforementioned combination more suitable for the route to be made, it is known to equip the bicycle with a plurality of guide toothed wheels and with a plurality of sprockets, which can be combined with each other based upon requirements, through appropriate gear-shifting devices.

Over the past few years the number of transmission ratios available in gearshifting devices has progressively increased and on the market currently there are groups of wheels with ten sprockets and groups of wheels with three guide wheels.

Above all in the field of racing bicycles, the progressive increase in the number of toothed wheels requires an ever-increasing search to reduce the weight of the assembly of wheels.

For this reason, assemblies of sprockets have been made comprising a plurality of sprocket support members that carry respective toothed wheels, in the form of circular toothed crowns: since the support members are made from a lighter material than the material of the toothed wheel, the desired reduction in weight of the assembly is obtained.

Since bicycle components have reached a high degree of standardization, the characteristic size of components like the frame, the gearshifting device and the free body are now almost fixed. In the prior art, some limits have been established in the maximum number of guide toothed wheels and of sprockets that can be mounted on standard sized bicycles. These limits currently seem insurmountable without modifying the standardized size of the bicycle components, in particular without increasing the axial size of the aforementioned groups of guide toothed wheels and of sprockets.

Indeed, keeping fixed the aforementioned standardized axial size, an increase in the number of toothed wheels would result in the need to arrange such toothed wheels in positions ever closer one to the other and the space available for the support members of the toothed wheels would become increasingly small, which may thus no longer have the characteristics of rigidity and strength necessary to support the toothed wheels.

SUMMARY

An assembly of toothed wheels of a bicycle, comprises at least two toothed wheels of different diameter and at least one support member of at least one toothed wheel of the at least two toothed wheels on a component of a bicycle, wherein the at least one support member is at least partially housed in at least one cavity of at least one other toothed wheel of the at least two toothed wheels.

BRIEF DESCRIPTION OF THE DRAWING(S)

Figure 2:
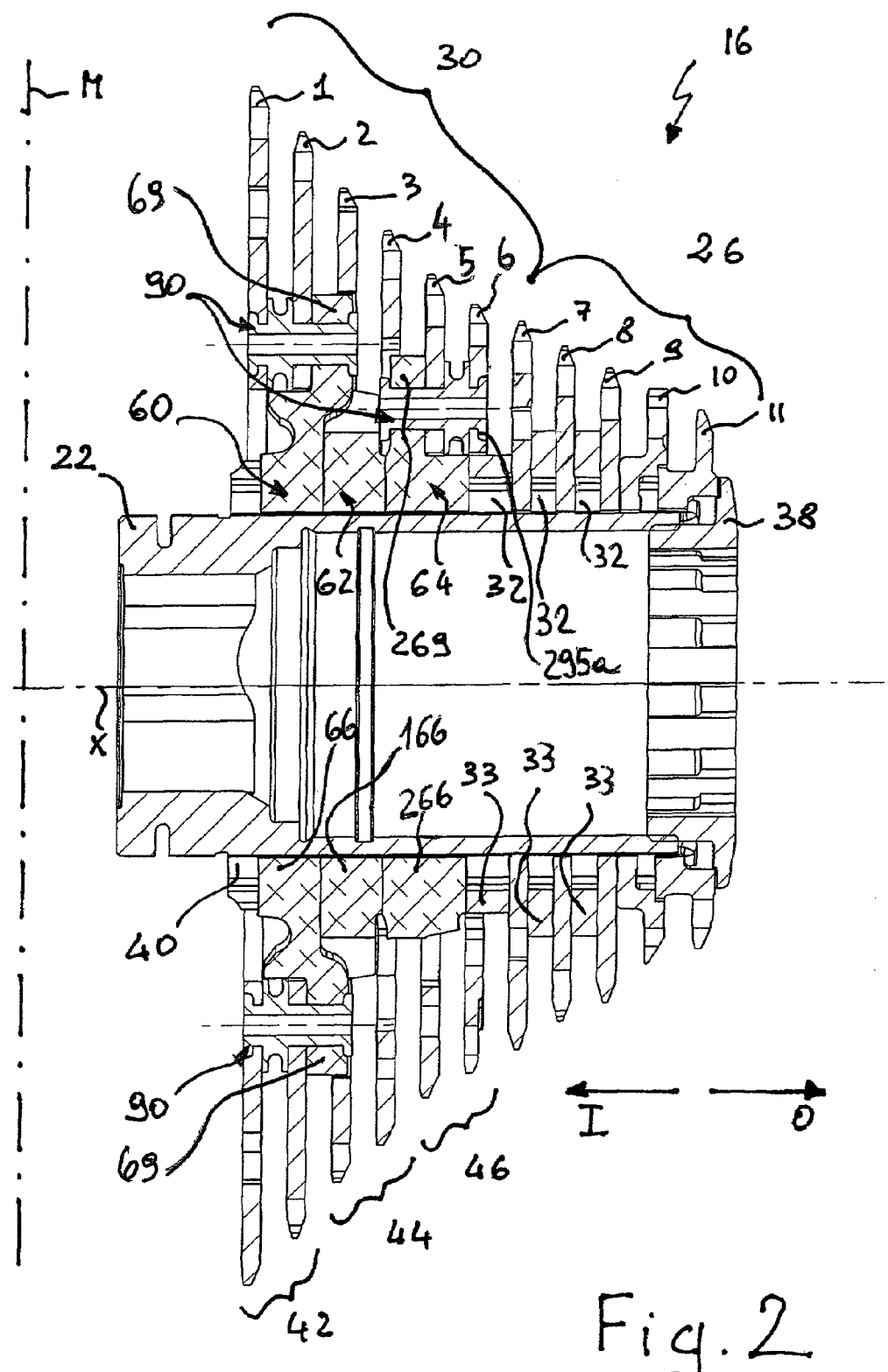
Figure 3:
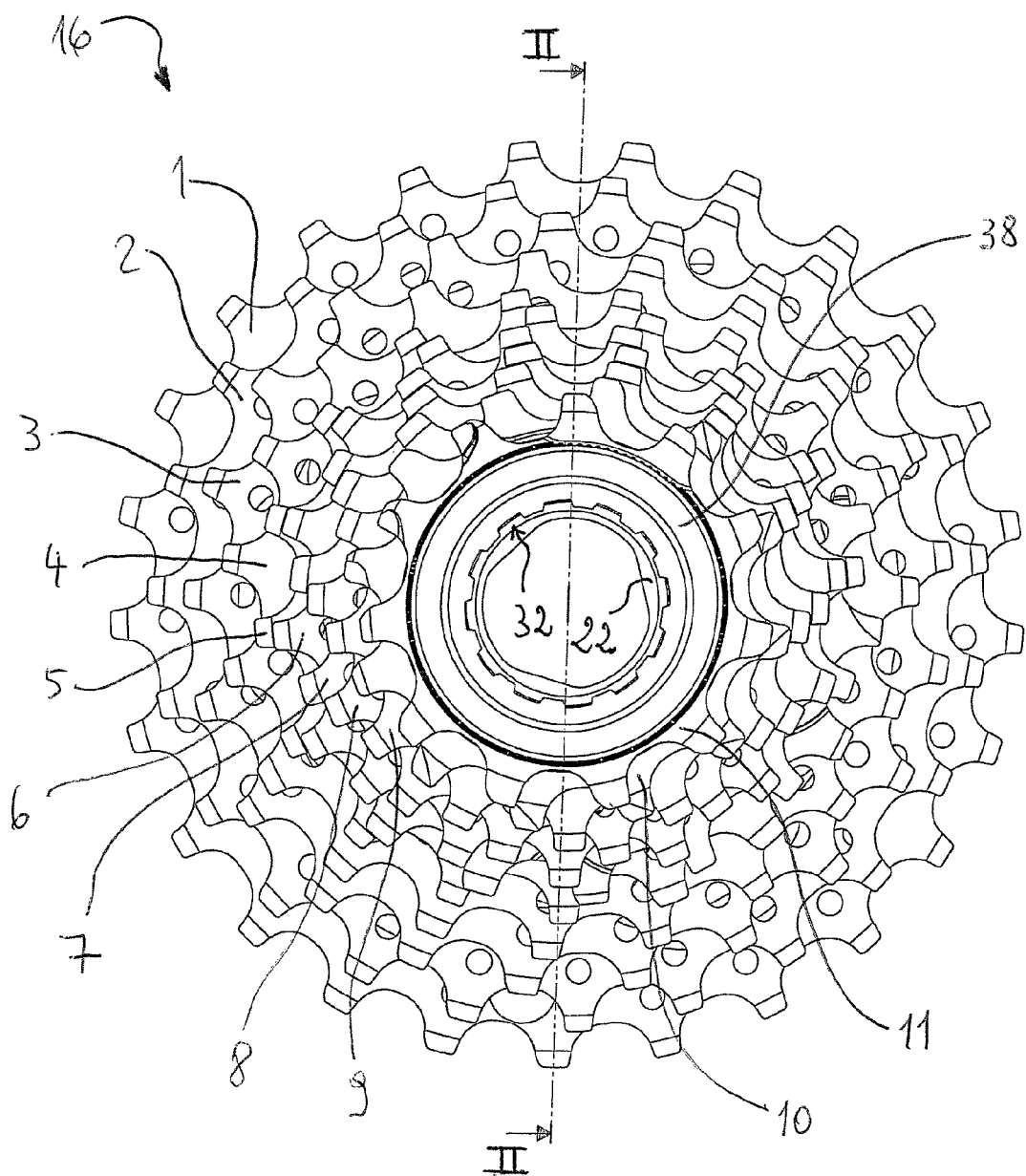
Figure 8:
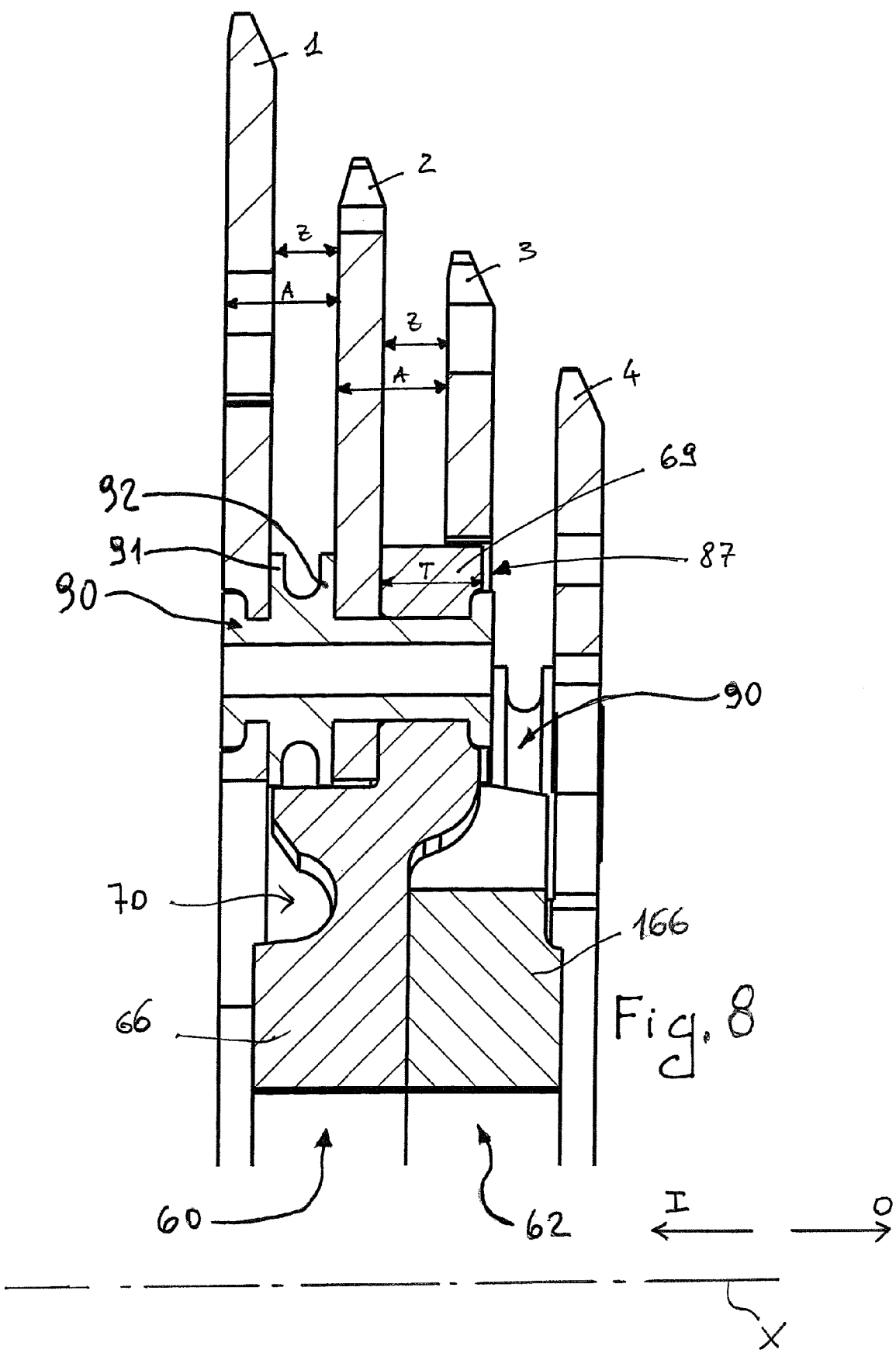
Figure 9:
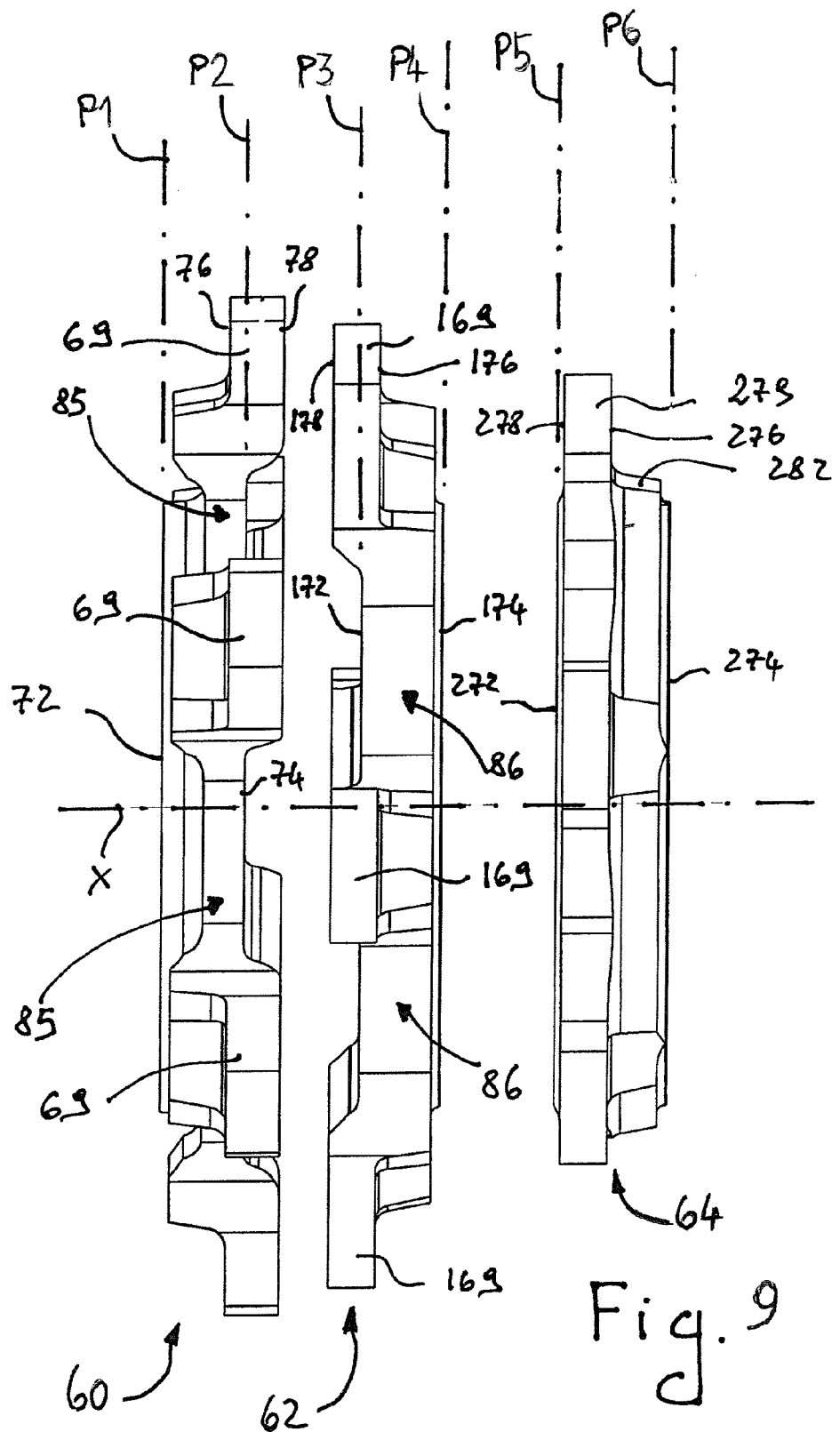
Figure 11:
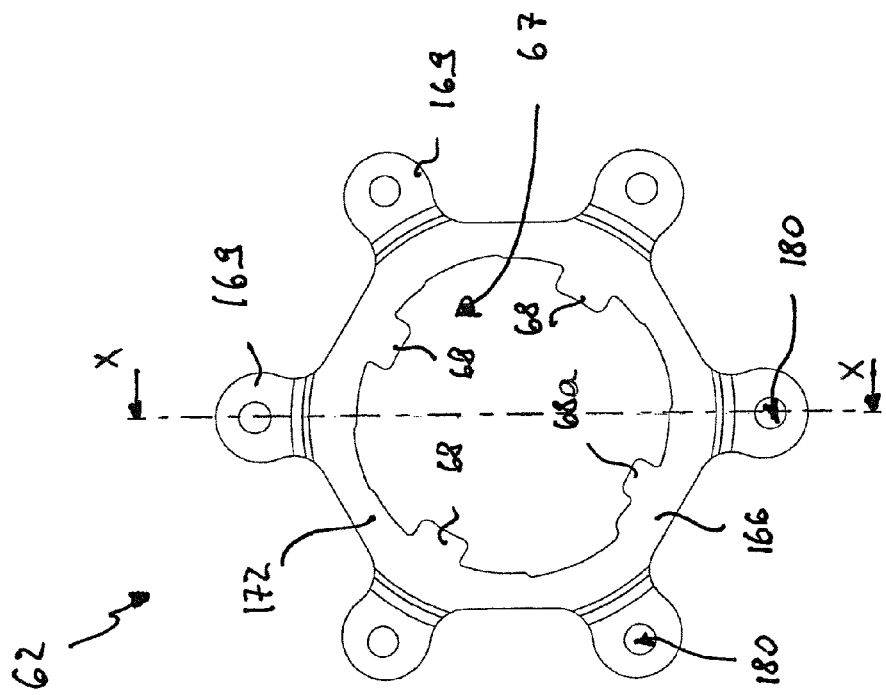
Figure 10:
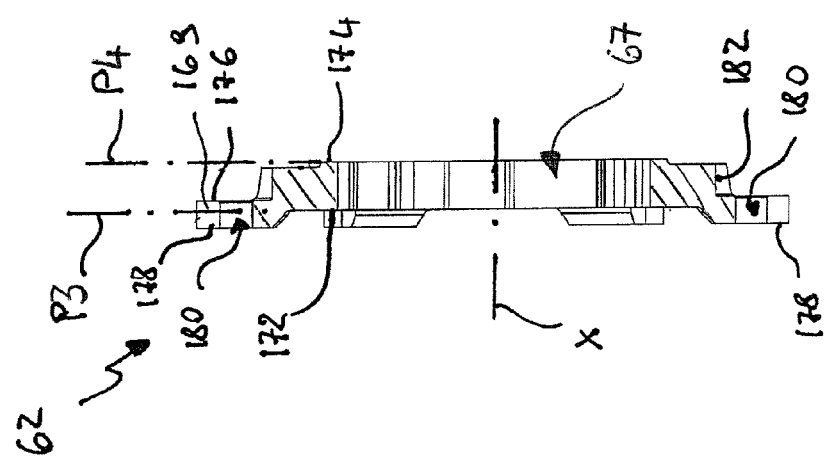
Figure 12:
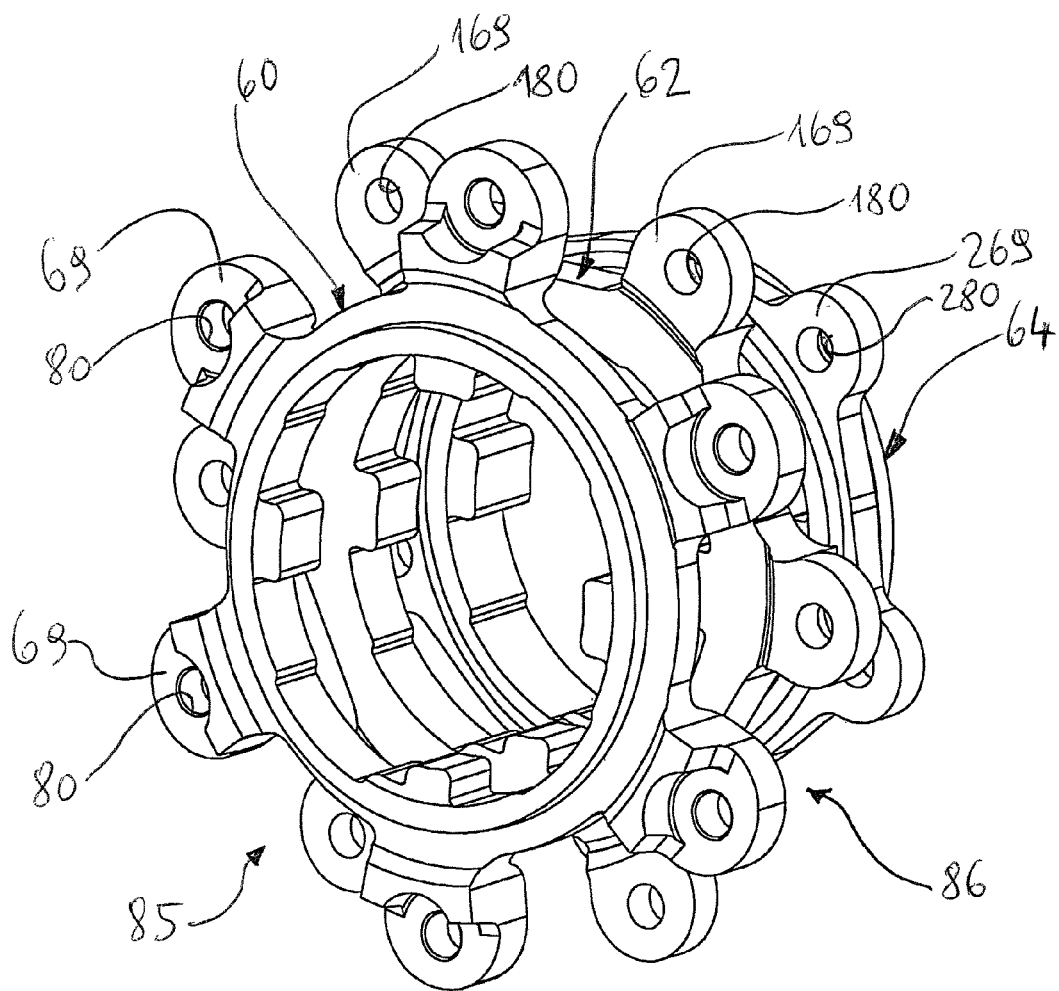
Figure 16:
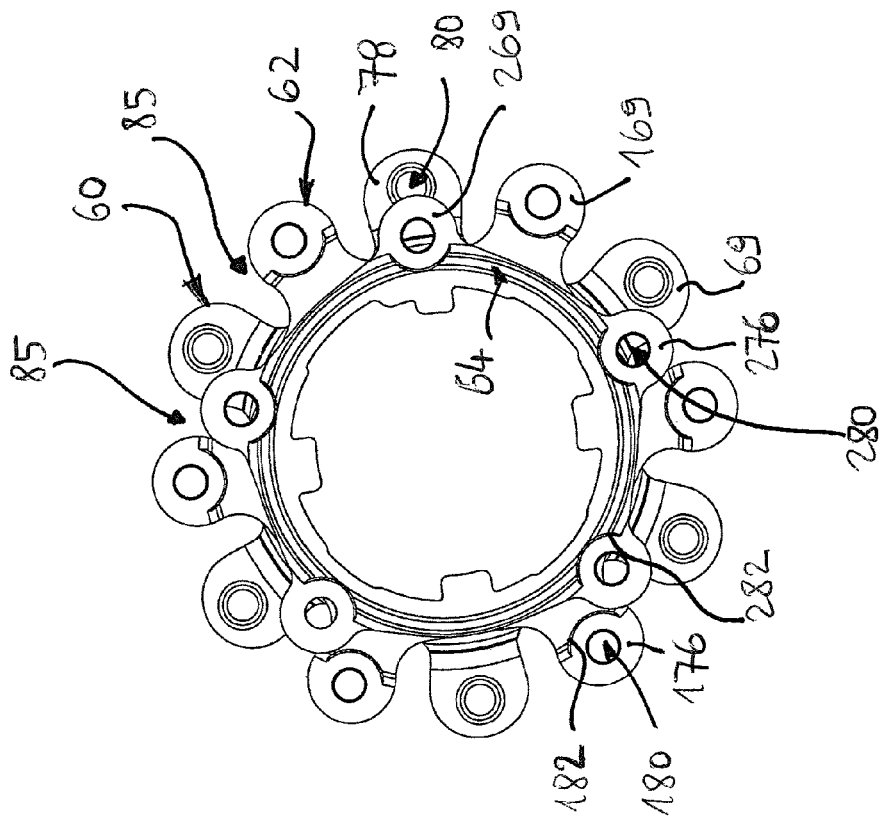
Figure 13:
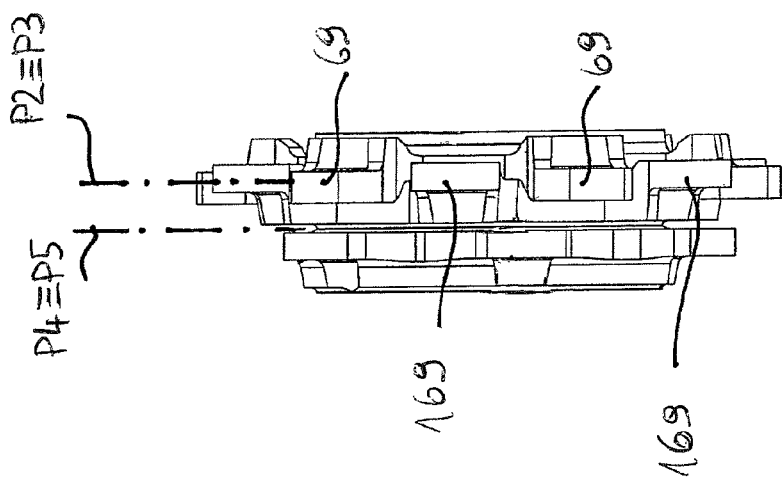
Figure 15:
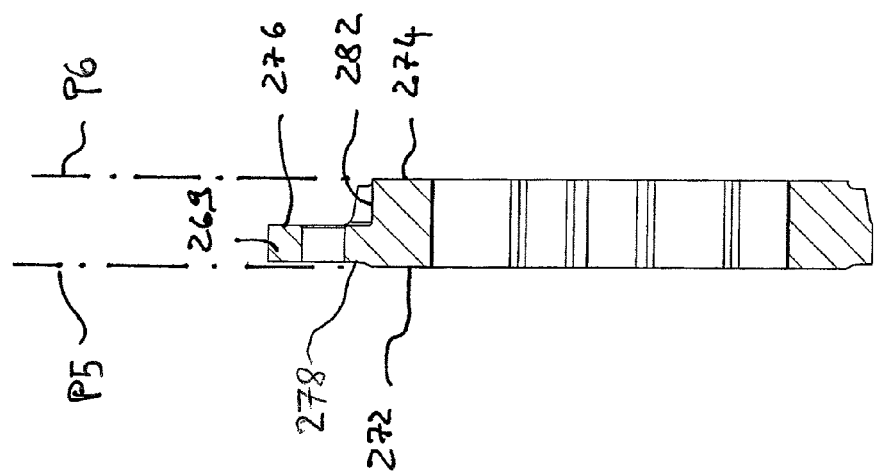
Figure 14:
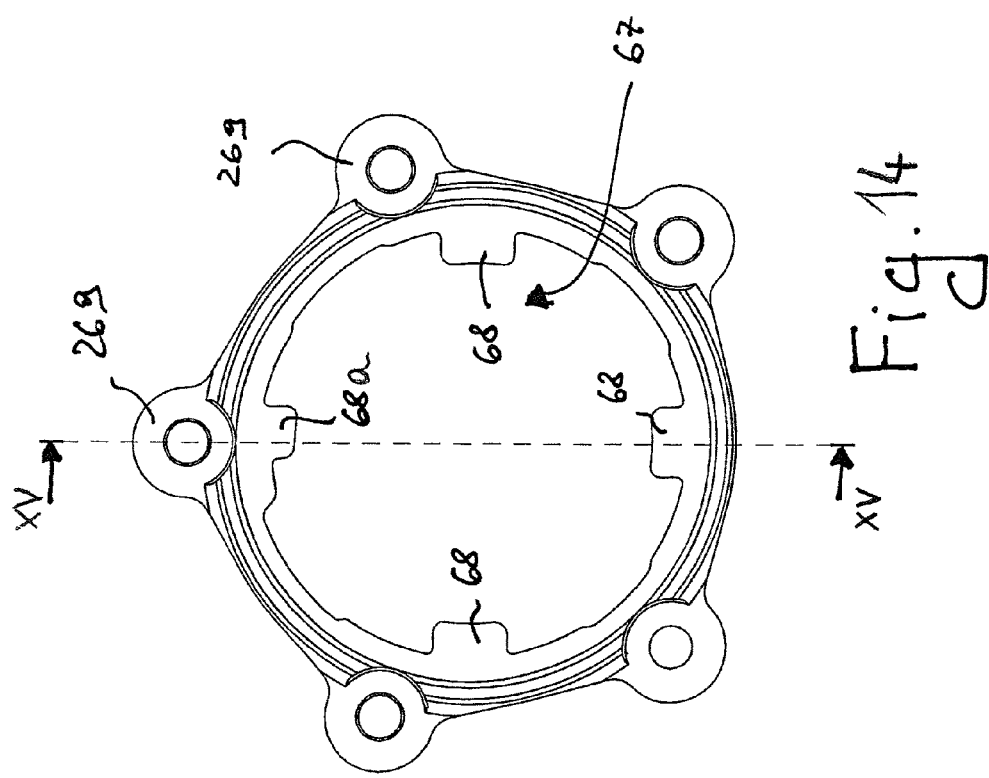
Figure 17:
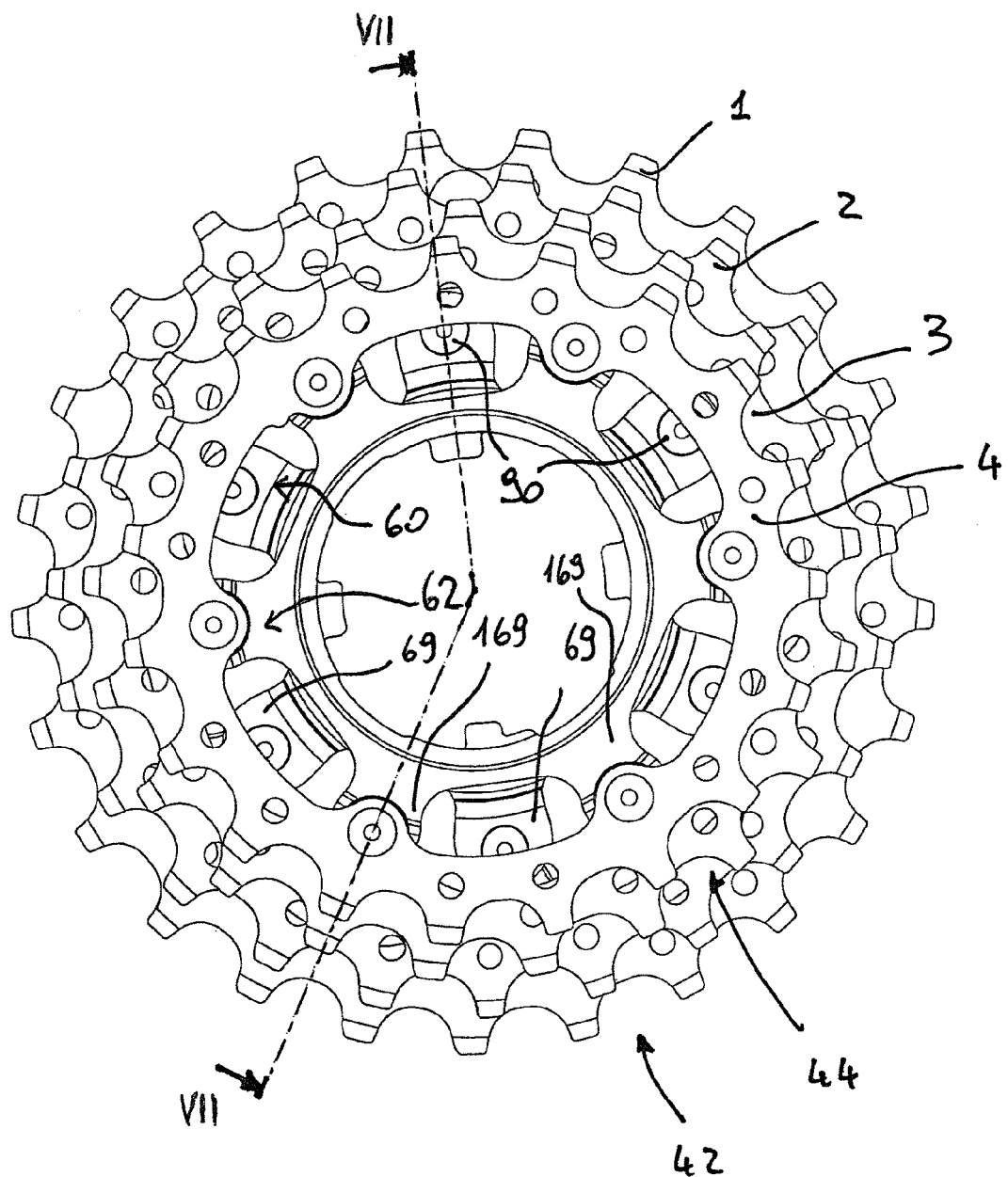
Figure 18:
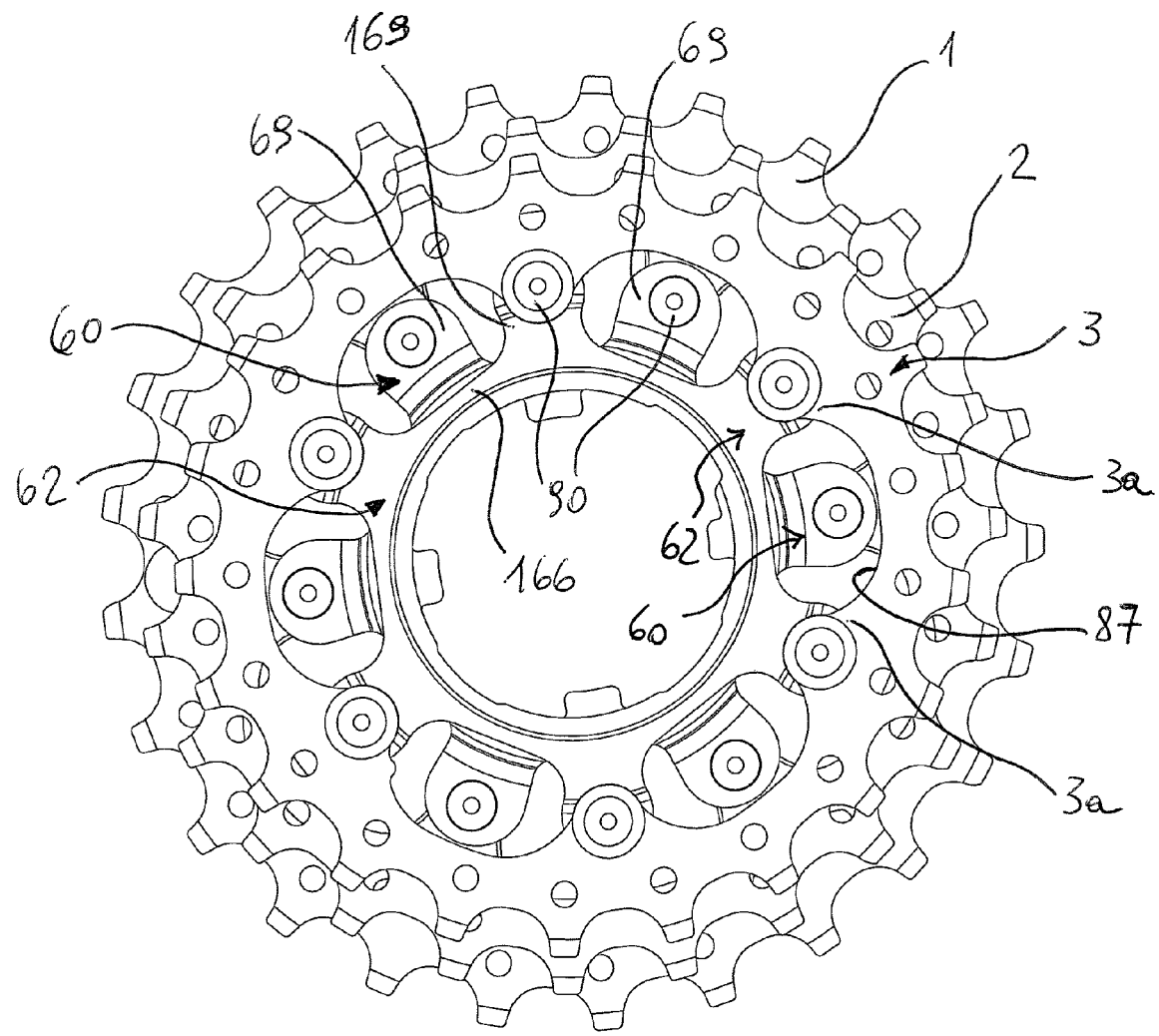
Figure 19:
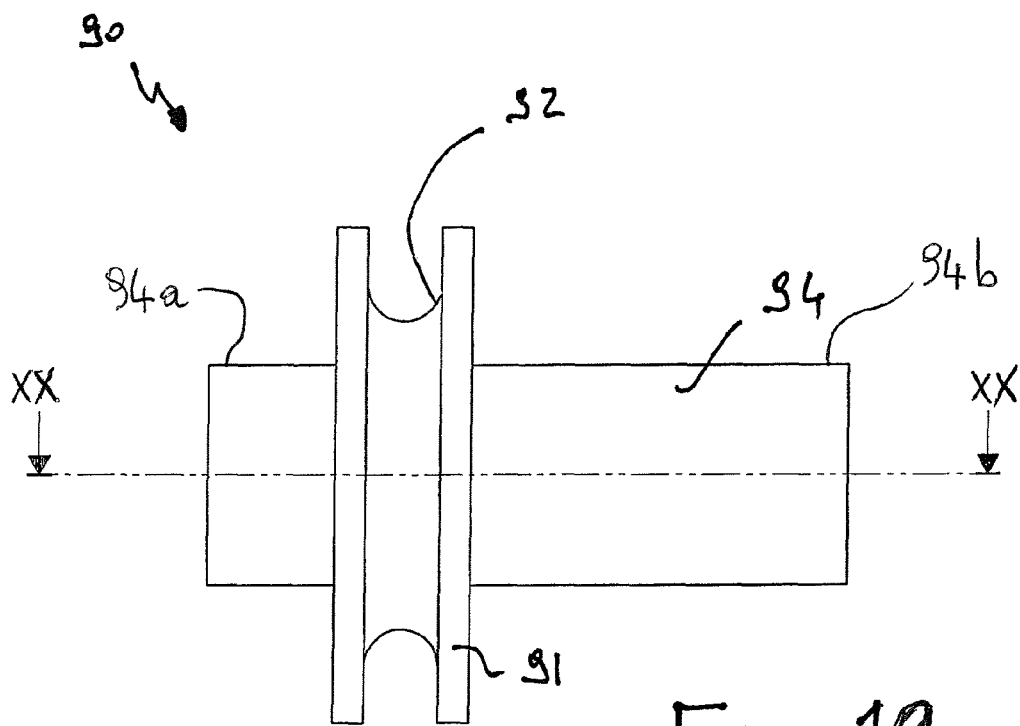
Figure 20:
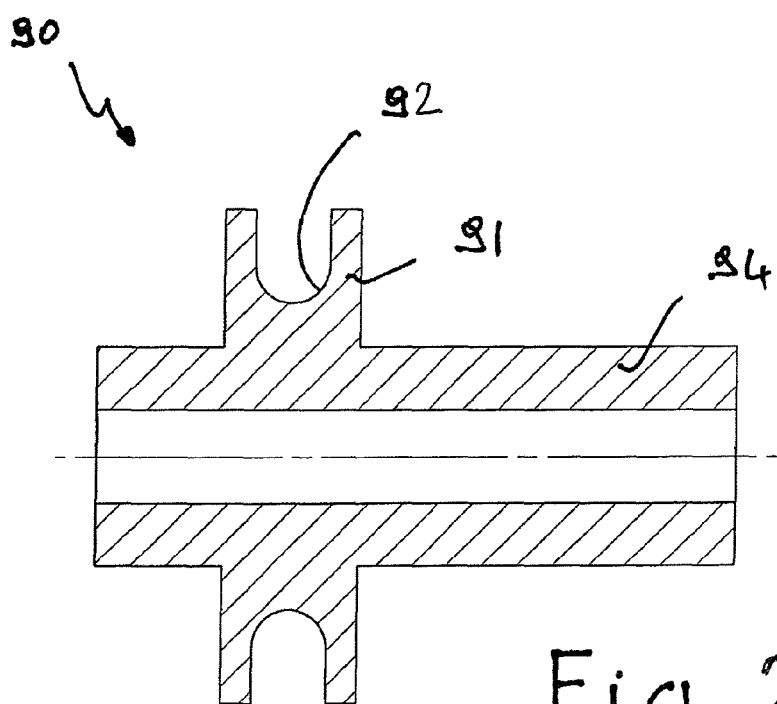
Figure 21:
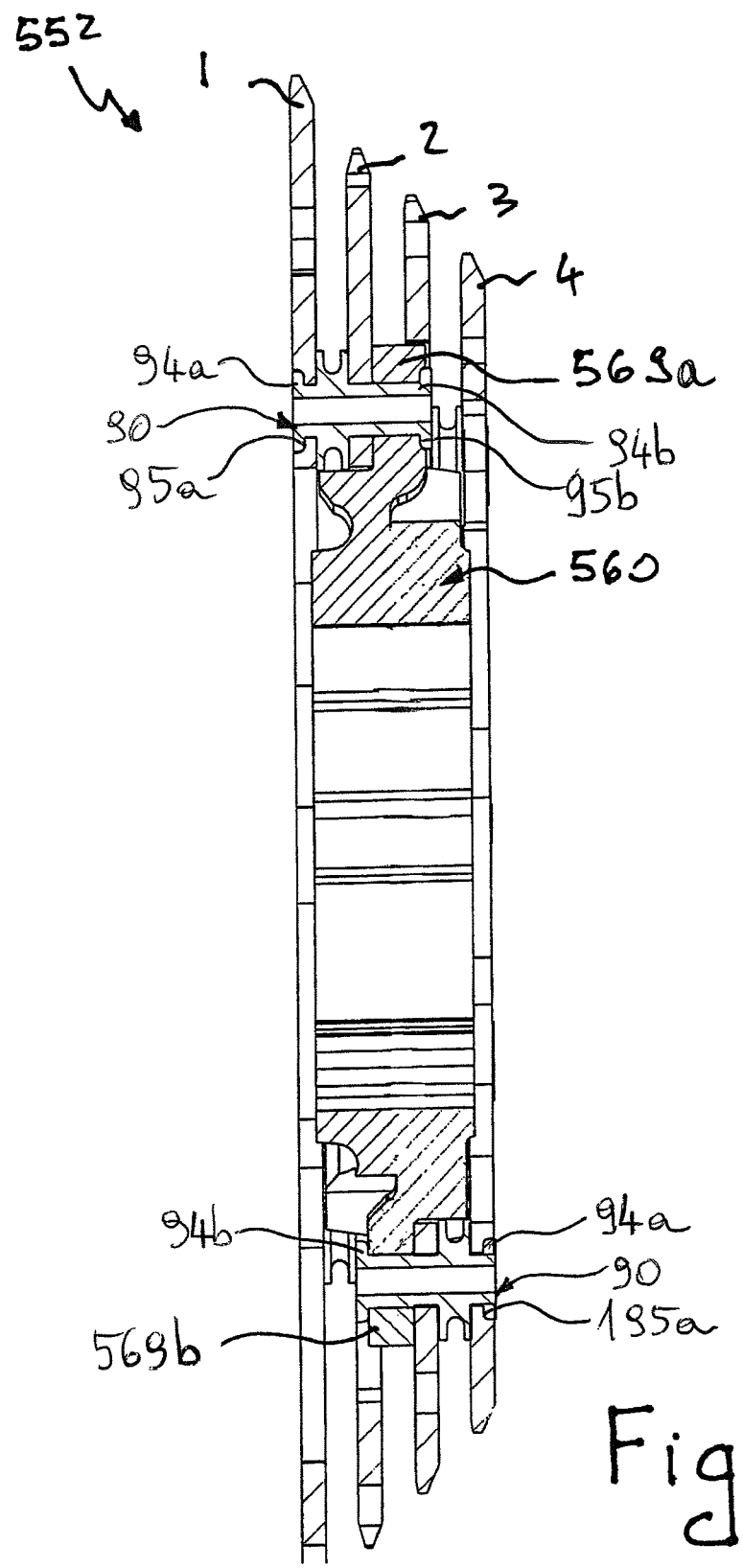
Figure 22:
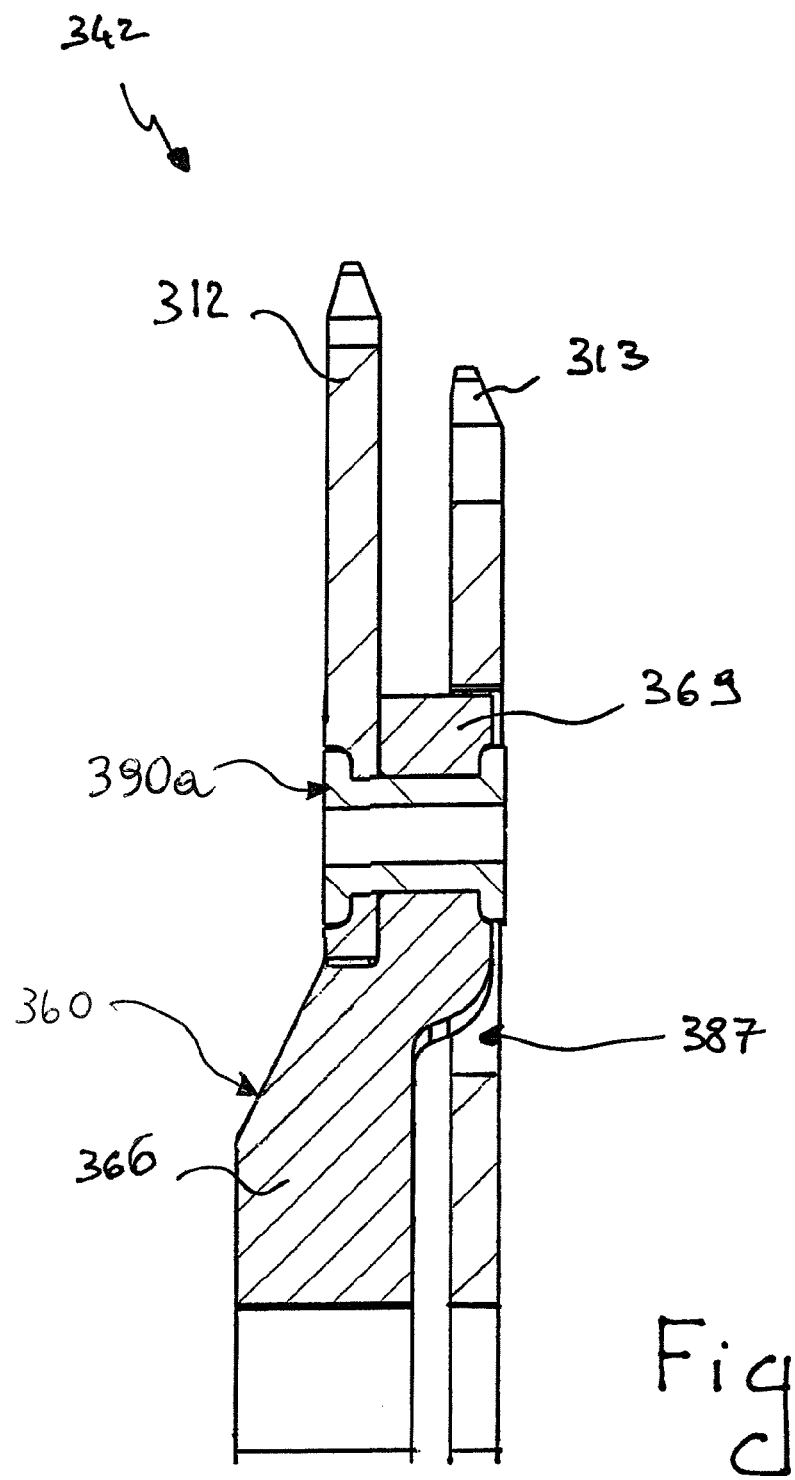
Figure 23:
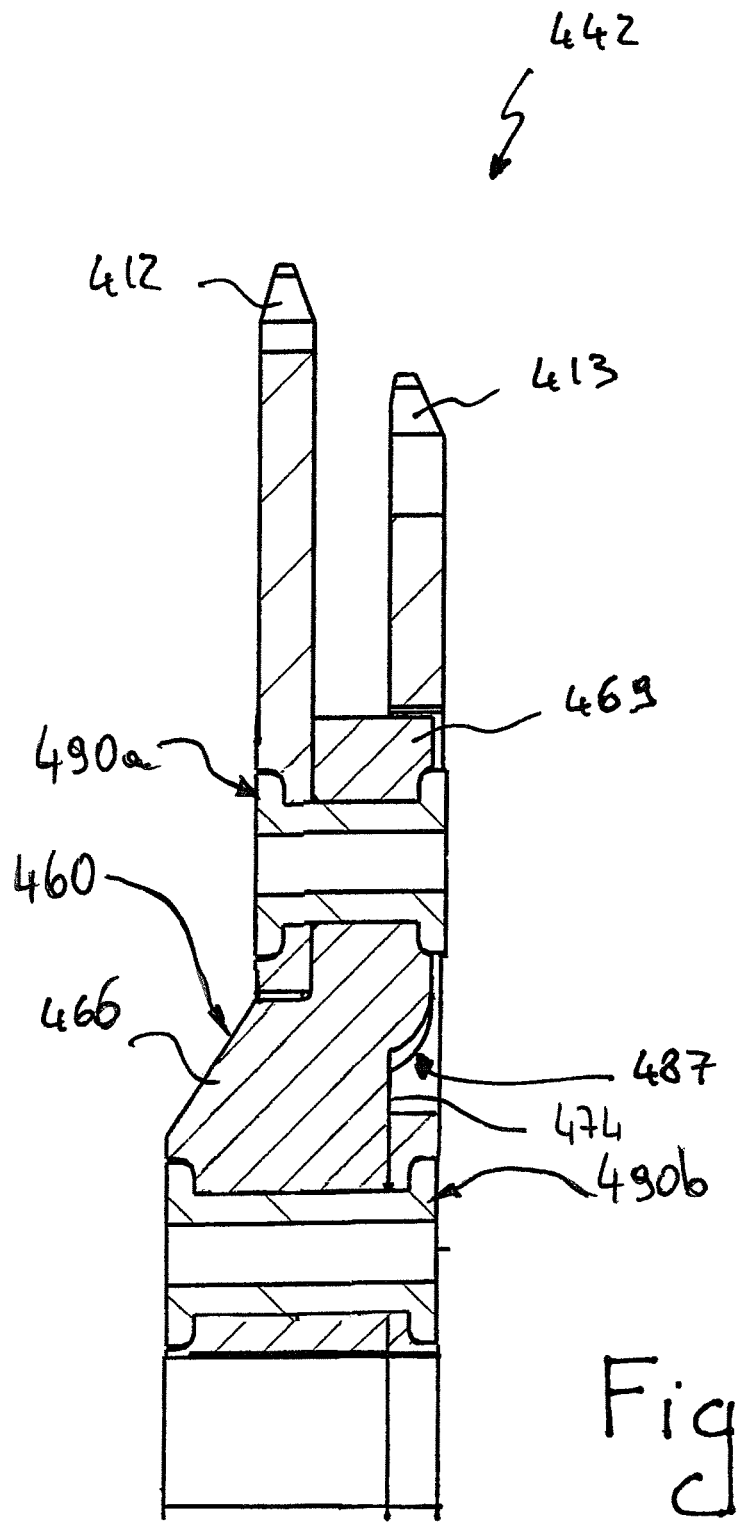

Further characteristics and advantages shall become clearer from the following detailed description of some preferred embodiments thereof, made with reference to the attached drawings, given for indicating and not limiting purposes. In such drawings:

FIG. 1 schematically represents a side elevation view of a bicycle comprising an assembly of toothed wheels;

FIG. 2 schematically represents a longitudinal section view of a sprocket assembly mounted on a free body of a hub of a rear wheel of the bicycle, such a sprocket assembly comprising a first embodiment of an assembly of toothed wheels;

FIG. 3 schematically represents a front elevation view of the assembly of FIG. 2, the plane traced with the line II-II of FIG. 3 being the plane along which the assembly of FIG. 2 is sectioned to obtain FIG. 2;

FIG. 4 schematically represents a front elevation view of a component of the assembly of FIG. 2, and precisely a first sprocket support member;

FIG. 5 schematically represents a diametric section view of the first sprocket support member of FIG. 4, taken according to the plane traced with the line V-V of FIG. 4;

FIG. 6 schematically represents a top rear view of the first sprocket support member of FIG. 4;

FIG. 7 schematically represents a longitudinal section view of a portion of the sprocket assembly of FIG. 2, comprising a first and a second sprocket support member and the four sprockets of larger diameter, the first support member being the same one shown in FIG. 4;

FIG. 8 schematically represents an enlarged view of a detail of FIG. 7;

FIG. 9 schematically represents an exploded view of three components of the sprocket assembly of FIG. 2, in particular of a first, a second and a third sprocket support member, the first and the second support member being the same as those shown in FIG. 7;

FIG. 10 schematically represents a rear elevation view of the second sprocket support member of FIG. 9;

FIG. 11 schematically represents a diametric section view of the second sprocket support member of FIG. 10, taken according to the plane traced with the line X-X of FIG. 11;

FIG. 12 schematically represents a perspective view of the three components of the sprocket assembly of FIG. 9, in an assembled configuration;

FIG. 13 schematically represents a side elevation view of the three components of the sprocket assembly of FIG. 12;

FIG. 14 schematically represents a front elevation view of the third sprocket support member shown in FIG. 9;

FIG. 15 schematically represents a longitudinal section view of the third sprocket support member of FIG. 14, taken according to the plane traced with the line XV-XV of FIG. 14;

FIG. 16 schematically represents a front elevation view of a portion of the sprocket assembly of FIG. 3, comprising a first, a second, and a third sprocket support member;

FIG. 17 schematically represents a front elevation view of the portion of sprocket assembly of FIG. 7, the plane traced with the line VII-VII of FIG. 17 being the plane along which the portion of FIG. 17 is sectioned to obtain FIG. 7;

FIG. 18 schematically represents a front elevation view of the portion of the sprocket assembly of FIG. 17, without the sprocket of smaller diameter;

FIG. 19 schematically represents a side elevation view of an attachment element for toothed wheels used in the assembly of FIG. 2;

FIG. 20 schematically represents a longitudinal section view of the attachment element of FIG. 19, taken according to the plane traced with the line XX-XX of FIG. 19;

FIG. 21 schematically represents a longitudinal section view of a portion of a sprocket assembly comprising a second embodiment of an assembly of toothed wheels, such an assembly comprising a sprocket support member and four sprockets;

FIG. 22 schematically represents a longitudinal section view of a portion of a sprocket assembly comprising a third embodiment of an assembly of toothed wheels, such an assembly comprising a support member for a sprocket and a free sprocket;

FIG. 23 schematically represents a longitudinal section view of a portion of a sprocket assembly comprising a fourth embodiment of an assembly of toothed wheels, such an assembly comprising a support member for a sprocket and a sprocket fixedly connected thereto.

DETAILED DESCRIPTION OF THE PREFERRED EMBODIMENT(S)

Introduction

Throughout the present description and in the subsequent claims the expression "assembly of toothed wheels" is used to indicate a structural unit comprising at least two toothed wheels and at least one support member of at least one of these toothed wheels.

In the present patent application, by toothed wheels of a bicycle it is meant both the guide toothed wheels, made to rotate by direct coupling with the pair of crank arms of the bicycle, and the driven toothed wheels, mounted on a rear bicycle wheel and made to rotate by the guide toothed wheels through the chain of the bicycle. Such driven toothed wheels are also known in technical jargon as "sprockets."

An assembly of toothed wheels of a bicycle of the type considered above is capable of allowing an increase in the maximum number of guide toothed wheels and/or of sprockets that can be mounted on a bicycle having standard sized components.

Therefore, an assembly of toothed wheels of a bicycle, comprises at least two toothed wheels of different diameter and at least one support member of at least one toothed wheel of the at least two toothed wheels on a component of a bicycle, wherein the at least one support member is at least partially housed in at least one cavity of at least one other toothed wheel of the at least two toothed wheels.

In the assembly, the distance between the toothed wheels of the aforementioned assembly is lower than the thickness of the support member of the toothed wheels themselves. In this way, unlike known assemblies, the distance between the toothed wheels of the assembly is not strictly linked to the thickness of the support member, which can thus maintain a strong, resistant section at the attachment area to the respective toothed wheel.

The assembly can comprise more toothed wheels for the same standardized axial size of the component of the bicycle on which the assembly itself is mounted. For example, the assembly allows, in the case of the rear bicycle wheel, a sprocket assembly to be made comprising a eleven sprockets, like for example the one described in detail hereinafter.

Moreover, the support member can be made from lighter material than the material of the toothed wheel, for which reason the increase in the number of toothed wheels mounted on the bicycle does not imply an increase in weight of the sprocket assembly.

The assembly of toothed wheels may comprise a first support member of at least one first toothed wheel that comprises a first substantially annular central portion and at least one plurality of first arms extending radially outwards from the first substantially annular central portion, each of the first arms comprising at least one first through hole for housing a respective first attachment element to the at least one first toothed wheel, each of the first arms being at least partially housed in a respective cavity of at least one second toothed wheel. Therefore, the distance between the first toothed wheel and the second toothed wheel may be lower than the thickness of the support member of the first toothed wheel.

Each of the first arms may be axially displaced by a predetermined amount, with respect to the first substantially annular central portion, towards the at least one second toothed wheel.

The at least one first toothed wheel may comprise a plurality of first radial extensions facing inwardly, each of the first radial extensions comprising at least one second through hole aligned with the at least one first through hole for coupling with the first support member through the first attachment element.

The assembly of toothed wheels may comprise a further first toothed wheel having a diameter different to that of the at least one first toothed wheel and associated with the first support member on the same side as the at least one first toothed wheel and in a more axially inner position with respect to the at least one first toothed wheel, the further first toothed wheel being at a predetermined distance from the at least one first toothed wheel.

The further first toothed wheel may comprise at least one plurality of third through holes aligned with the first and second through holes for coupling with the first support member and with the at least one first toothed wheel through the first attachment elements. The further first toothed wheel is then associated with the first support member through the same attachment elements used to associate the first toothed wheel with the first support member. Thus, the number of attachment elements used in the assembly is thus contained, this implying the weight of such an assembly being consequently also contained.

Each of the first attachment elements may comprise a substantially tubular body at least partially housed in a respective first hole and an intermediate portion projecting radially outwards and acting in abutment against the at least one first toothed wheel on the opposite side to the first arm. Thus, the tubular shape of the attachment element ensures a contained weight while ensuring at the same time an adequate level of strength.

Moreover, the intermediate portion may be operatively arranged between the further first toothed wheel and the at least one first toothed wheel. Thus, the aforementioned intermediate portion acts as a spacer between the sprockets supported by the support member.

Further, the intermediate portion may be circumferentially grooved. Advantageously, the circumferential groove contributes to reducing the weight of the attachment element.

Each of the first arms comprises an abutment surface having generatrixes substantially parallel to a rotation axis of the assembly and acting in abutment on the intermediate portion and on the at least one first toothed wheel. Therefore, the aforementioned abutment surface provides a radial support to the intermediate portion of the attachment element and to the first toothed wheel. Therefore, just the further first toothed wheel is supported cantilevered by the first support member.

In an embodiment thereof, the assembly comprises a second support member of the at least one second toothed wheel that comprises a second substantially annular central portion in abutment against the first substantially annular central portion at a first abutment plane and at least one plurality of second arms extending radially outwards from the second substantially annular central portion, each of the second arms comprising at least one fourth through hole for housing a respective second attachment element to the at least one second toothed wheel, each of the second arms being at least partially housed in a respective cavity of the at least one first toothed wheel, the first arms being angularly staggered with respect to the second arms in a circumferential direction. Thus, the distance between the first toothed wheel and the second toothed wheel is also lower than the thickness of the support member of the second toothed wheel.

Each of the second arms may be axially displaced by a predetermined amount, with respect to the second substantially annular central portion, towards the at least one first toothed wheel, and the at least one second toothed wheel is arranged on the opposite side to the at least one first toothed wheel with respect to the first abutment plane.

The at least one second toothed wheel may comprise a plurality of second radial extensions facing inwardly, each of the second radial extensions comprising at least one fifth through hole aligned with the at least one fourth through hole for coupling with the second support member through the second attachment element.

The assembly may comprise a further second toothed wheel having a diameter different to that of the at least one second toothed wheel and associated with the second support member on the same side as the at least one second toothed wheel and in a more axially outer position with respect to the at least one second toothed wheel, the further second toothed wheel being at a predetermined distance from the at least one second toothed wheel.

The further second toothed wheel may comprise at least one plurality of sixth through holes aligned with the fourth and fifth through holes for coupling with the second support member and with the at least one second toothed wheel through the second attachment elements. Thus, the further second toothed wheel is then associated with the second support member through the same attachment elements used to associate the second toothed wheel with the second support member. The number of attachment elements used in the assembly is thus contained, this implying the weight of such an assembly being consequently also contained.

Each of the second attachment elements may comprise a substantially tubular body at least partially housed in a respective fourth hole and an intermediate portion projecting radially outwards and acting in abutment against the at least one second toothed wheel on the opposite side to the second arm.

The intermediate portion is operatively arranged between the further second toothed wheel and the at least one second toothed wheel.

Moreover, the intermediate portion may be circumferentially grooved.

Each of the second arms comprises an abutment surface having generatrixes substantially parallel to a rotation axis of the assembly and acting in abutment on the intermediate portion and on the at least one second toothed wheel. Thus, the aforementioned abutment surface provides a radial support to the intermediate portion of the attachment element and to the second toothed wheel. Therefore, just the further second toothed wheel is supported cantilevered by the second support member.

The second attachment element may be substantially the same as the first attachment element.

In an alternative embodiment of the assembly, the at least one second toothed wheel is associated with the first support member.

The first support member may also comprise a plurality of second arms extending radially outwards from the first substantially annular central portion, each of the second arms comprising at least one fourth through hole for housing a respective second attachment element to the at least one second toothed wheel, each of the second arms being at least partially housed in a respective cavity of the at least one first toothed wheel.

Moreover, the at least one second toothed wheel may comprise a plurality of second radial extensions facing inwardly, each of the second radial extensions comprising at least one fifth through hole aligned with the at least one fourth through hole for coupling with the first support member through the second attachment element.

The assembly may comprise a further second toothed wheel having a diameter different to that of the at least one second toothed wheel and associated with the first support member on the same side as the at least one second toothed wheel and in a more axially outer position with respect to the at least one second toothed wheel, the further second toothed wheel being at a predetermined distance from the at least one second toothed wheel.

Moreover, the further second toothed wheel may comprise at least one plurality of sixth through holes aligned with the fourth and fifth through holes for coupling with the first support member and with the at least one second toothed wheel through the second attachment elements.

Each of the second attachment elements may comprise a substantially tubular body at least partially housed in a respective fourth hole and an intermediate portion projecting radially outwards and acting in abutment against the at least one second toothed wheel on the opposite side to the second arm.

Moreover, the intermediate portion may be operatively arranged between the further second toothed wheel and the at least one second toothed wheel.

Moreover, the intermediate portion may be circumferentially grooved.

Each of the second arms may comprise an abutment surface having generatrixes substantially parallel to a rotation axis of the assembly and acting in abutment on the intermediate portion and on the at least one second toothed wheel.

The second attachment element may be substantially the same as the first attachment element.

The at least one second toothed wheel may be associated with the first annular central portion of the first support member.

Moreover, the at least one second toothed wheel may be connected to the first annular central portion through riveting.

In another embodiment thereof, the assembly may also comprise a third support member of at least one third toothed wheel that comprises a third substantially annular central portion in abutment against the second substantially annular central portion on the opposite side to the first substantially annular central portion at a second abutment plane.

The third support member may comprise at least one plurality of third arms extending radially outwards from the third substantially annular central portion, each of the third arms comprising at least one seventh through hole for housing a respective third attachment element to the at least one third toothed wheel, each of the third arms being at least partially housed in a respective cavity of a toothed wheel supported by the second support member.

Moreover, the third arms may be angularly staggered with respect to the second arms in a circumferential direction. Thus, the distance between the toothed wheel supported by the third support member and a toothed wheel supported by the second support member is lower than the thickness of the support member of the third toothed wheel.

The at least one third toothed wheel may be arranged on the opposite side to the at least one second toothed wheel with respect to the second abutment plane.

The at least one third toothed wheel may comprise a plurality of third radial extensions facing inwardly, each of the third radial extensions comprising at least one eighth through hole aligned with the at least one seventh through hole for coupling the at least one third toothed wheel with the third support member.

The assembly may comprise a further third toothed wheel having a diameter different to that of the at least one third toothed wheel and associated with the third support member on the same side as the at least one third toothed wheel and in a more axially outer position with respect to the at least one third toothed wheel, the further third toothed wheel being at a predetermined distance from the at least one third toothed wheel.

The further third toothed wheel may comprise at least one plurality of ninth through holes aligned with the seventh and eighth through holes for coupling with the third support member and with the at least one third toothed wheel. Advantageously, the further third toothed wheel is then associated with the third support member through the same attachment elements used to associate the third toothed wheel with the third support member. The number of attachment elements used in the assembly is thus contained, this implying the weight of such an assembly being consequently also contained.

Each of the third attachment elements may comprise a substantially tubular body at least partially housed in a respective seventh hole and an intermediate portion projecting radially outwards and acting in abutment against the at least one third toothed wheel on the opposite side to the third arm.

The intermediate portion may be operatively arranged between the further third toothed wheel and the at least one third toothed wheel.

The intermediate portion may be circumferentially grooved.

Each of the third arms may comprise an abutment surface having generatrixes substantially parallel to a rotation axis of the assembly and acting in abutment on the intermediate portion and on the at least one third toothed wheel. Thus, the aforementioned abutment surface provides a radial support to the intermediate portion of the attachment element and to the third toothed wheel. Therefore, just the further third toothed wheel is supported cantilevered by the third support member.

The third attachment element may be substantially the same as the first and second attachment element.

In another embodiment of the assembly, the number of the second arms and the first arms is the same. Moreover, the number of the third arms may be lower than that of the first and second arms. Indeed, due to the fact that the toothed wheels associated with the third support member have a diameter smaller than that of the wheels supported by the first and second support member, less strengthening is necessary and it is thus possible to limit the fixing points to the third support member.

The third arms may have a shorter radial extension than that of the first and second arms. In this way problems of interference between the third arms and the sprockets and/or the attachment elements mounted on the first and second arms are avoided.

In a further embodiment of the assembly, the at least one second toothed wheel is adapted to be coupled directly with the component of the bicycle.

In a further embodiment of the assembly, the at least one second wheel is not associated with the first support member.

In all of the embodiments thereof, the assembly of toothed wheels can comprise a lightening throat formed at the base of each arm.

Moreover, the at least one cavity entirely may cross the thickness of the respective toothed wheel.

There is a plurality of the cavities and they are substantially equally spaced apart circumferentially.

In another embodiment of the assembly of toothed wheels, the toothed wheels are sprockets of a rear bicycle wheel and the component is a free body of a hub of a rear bicycle wheel.

The at least one support member may comprise a radially inner surface having a profile adapted to transmit a torque to the free body.

Moreover, the surface may be a grooved surface.

Even further, the profile may comprise a plurality of teeth of the same shape and at least one tooth of a different shape. Thus, the presence of the differently shaped tooth ensures that the assembly is mounted on the free body of the hub in a single predetermined position.

The thickness of the at least one sprocket and the distance between the at least two sprockets are selected so that their sum is comprised between 3 mm and 4.5 mm, more preferably between 3.5 and 4 mm.

In an alternative embodiment of the assembly of toothed wheels, the toothed wheels are guide toothed wheels of a bicycle and the component is a shaft of a bottom bracket assembly of the bicycle.

In a second aspect thereof, a sprocket assembly comprises at least one assembly of toothed wheels of the type described above.

Such a sprocket assembly may have individually or in combination all of the structural and functional characteristics discussed above with reference to the assembly of toothed wheels and therefore has all of the aforementioned advantages.

In particular, the aforementioned sprocket assembly comprises, as well as the assembly of toothed wheels, at least one free toothed wheel adapted to be directly coupled with the component of the bicycle.

In a third aspect thereof, a bicycle comprises at least one assembly of toothed wheels of the type described above.

Such a bicycle has individually or in combination all of the structural and functional characteristics discussed above with reference to the assembly of toothed wheels.

In a fourth aspect thereof, an attachment element of two toothed wheels of a bicycle to a toothed wheels support member, comprises a tubular body and an intermediate portion projecting radially outwards from the tubular body, the intermediate portion having a circumferential groove on an outer edge thereof.

Thus, such an attachment element can be used in the assembly of toothed wheels described above.

Such an attachment element has individually or in combination all of the structural and functional characteristics discussed above with reference to the attachment element of the toothed wheels of the assembly and therefore it has the aforementioned advantages.

In particular, in an aforementioned attachment element the aforementioned intermediate portion is made in one piece with the tubular body, but in an alternative embodiment it can be a piece distinct from the tubular body.

DESCRIPTION

With particular reference to FIG. 1, a bicycle 51 is shown to which a sprocket assembly, wholly indicated with 16, is applied, such a sprocket assembly comprising an assembly of toothed wheels in accordance with the present invention.

In particular, hereinafter the non-limiting example of an assembly of toothed wheels mounted on a rear driving wheel 57 of the bicycle 51 is described, such an assembly constituting a portion of the sprocket assembly 16 indicated in FIG. 1. As shall become clear from the following description, the assembly of toothed wheels of the invention can also be mounted on the shaft of a bottom bracket assembly of a bicycle.

The bicycle 51 of FIG. 1 comprises a frame 53 to which a front wheel 55 and the rear driving wheel 57 are connected.

What makes the front wheel 55 different from the rear driving wheel 57 is that the second one receives the motion from the motion transmission system 59 of the bicycle 51. This system comprises a pair of crank arms 50 directly coupled with one or more guide toothed wheels 12. The crank arms 50 are supported in rotation in the frame 53 through a bottom bracket assembly 14 comprising a shaft and bearings. The guide toothed wheels 12 engage a chain 15 to transmit the torque applied by the cyclist on the crank arms 50 to the sprocket assembly 16 coupled with the rear driving wheel 57.

In particular, the rear driving wheel 57 comprises a rim 58, some spokes 18 and the hub 20. The hub 20 is per sè known and for this reason it is only schematically illustrated: it comprises a first body coupled with the rim 58 through the spokes 18 and a second body that rotates as a unit with the sprocket assembly 16. The second body is indicated with reference numeral 22 in FIG. 2 and it is the free body since it is free to rotate with respect to the first body in a direction of rotation, and makes it rotate with it in the opposite direction. The rotation axis is indicated with X in FIG. 2.

With reference to FIGS. 2 and 3, a first embodiment of the sprocket assembly 16 of the bicycle 51 is shown.

The sprocket assembly 16 comprises a plurality of driven toothed wheels, known as sprockets, having different outer diameters to each other: in the example illustrated in FIGS. 2 and 3, there are eleven sprockets and they are indicated with reference numerals 1 to 11, from the sprocket 1 having the greater outer diameter up to the sprocket 11 having the smaller outer diameter.

A gearshifting device 24, illustrated in FIG. 1, allows the chain 15 to be moved from an engagement condition with a sprocket to an engagement condition with another sprocket. A similar device can also be provided in the area of the crank arms 50 in the case in which there is more than one guide toothed wheel 12. In this way, the sprockets and the toothed wheels can be associated with each other through the chain 15 in a plurality of combinations.

With particular reference to FIG. 2, the sprockets from 1 to 11 are divided in the sprocket assembly 16 into two groups, a first group 26 comprises the sprockets from 7 to 11, hereafter the free sprockets because they are directly engaged with the free body 22, and a second group 30 comprises the sprockets from 1 to 6, known as fixedly connected sprockets because they are engaged with the free body 22 through support members, respectively indicated with 60, 62 and 64.

The group of sprockets 30 is in turn divided into structural units 42, 44 and 46 each comprising two sprockets rigidly connected to one of the support members: in particular, the sprockets 1 and 2 are fixedly connected to the support member 60, the sprockets 3 and 4 are fixedly connected to the support member 62 and the sprockets 5 and 6 are fixedly connected to the support member 64. Each of the aforementioned structural units, in the most simple and general embodiment thereof, constitutes an assembly.

With reference to FIG. 2, the free body 22, on the outer surface thereof, has a grooved profile 32 adapted to engage with a matching grooved profile made on the free sprockets 7-11 for a direct transmission of torque, and with an engagement profile 67 made on the support members 60, 62 and 64, for a indirect transmission of torque. A lockring 38 (also visible in FIG. 3) screwed at the head of the free body 22 keeps the sprocket assembly 16 in abutment against a shoulder 40 of the free body 22.

Throughout the present description, with reference to the position and orientation of the components with respect to the rear wheel 57 on which the sprocket assembly 16 is mounted, by "outer side" of the sprocket assembly it is meant that going away from a middle plane M of the wheel 57 along the rotation axis X, the outer side being indicated in FIG. 2 with the arrow O. By "inner side" of the sprocket set it is meant the side opposite the outer side and indicated with the arrow I in FIG. 2.

FIGS. 4-6 illustrate in detail the support member 60 of the sprocket assembly 16. In particular, the support member 60 comprises a substantially annular central portion 66, extending around the rotation axis X, on the radially inner edge of which a profile 67 for engagement with the grooved profile 32 of the free body 22 is defined. The engagement profile 67 comprises a plurality of teeth 68 of the same shape and at least one tooth 68a of a different shape to provide a reference for mounting on the free body 22 with a predetermined orientation.

A plurality of arms 69 (in the illustrated example, six arms) project from the substantially annular central portion 66 in a radially outer direction to support the sprockets 1 and 2 (FIGS. 2, 7 and 8). At the base of each arm 69 a lightening throat 70 is formed. The arms 69 are axially displaced by a predetermined amount with respect to the first substantially annular central portion 66, i.e. they have an "engagement" in the direction of the axis X with respect to the substantially annular central portion 66. In particular, as shall be made clear hereinafter, the arms 69 project axially outwards (i.e. in the direction O) with respect to the substantially annular central portion 66.

The substantially annular central portion 66 has an inner abutment face 72, which when mounted on the free body 22 is orientated in the direction of the axis X towards the inside of the wheel 57 so as to abut on the shoulder 40, and an outer abutment face 74, which is orientated in the opposite direction so as to abut on the support member 62. The faces 72 and 74 are flat so that they extend along respective radial planes P1 and P2, substantially perpendicular to the axis X (as can be seen in FIG. 9).

Each arm 69 has a first coupling face 76, oriented like the inner abutment face 72 but not aligned with it, and adapted to couple with the sprocket 2. The coupling face 76 is arranged between the planes P1 and P2. Alternatively, the coupling face 76 can be arranged in a position aligned with the plane P2 or even more axially outwardly, i.e. even farther away, in the axially outer direction to the wheel 57, from the plane P1.

A second face 78 of the arms 69, opposite the coupling face 76, is arranged axially farther out with respect to the plane P2. In this way, the attachment of the arms 69 to the substantially annular central portion 66 is strengthened through a joining portion 79 between the second face 78 and the inner face 74.

Each arm 69 also has a through hole 80 that extends from the coupling face 76 to the opposite face 78. The holes 80 of the plurality of the arms 69 are preferably all arranged at the same radial distance. In use, the holes 80 are intended to house attachment elements 90 like for example rivets. In particular, the attachment elements project cantilevered from the coupling surfaces 76 and are intended to lock the sprockets 1 and 2 on the support member 60, as shall be described in detail hereinafter.

In addition, each arm 69, on the side of the coupling surface 76, has an abutment surface 82 having generatrixes extending substantially parallel to the axis X, to provide an additional support in the radial direction to the canti-levered attachment elements 90. Preferably, such an additional support surface is a concave surface, even more preferably it is a cylindrical surface portion, however flat or convex surfaces are not excluded.

It should be observed that the arms 69 support at least two sprockets 1 and 2, arranged on the same side as the arms 69, with the sprocket 1 arranged in an axially more outer position than the sprocket 2 with respect to the arm 69 in the direction I.

FIGS. 10 and 11 illustrate the second support member 62 of the sprocket assembly 16 of FIG. 2. In such a support member, elements equal or corresponding to those of the support member 60 are indicated with the same reference numeral increased by 100.

The support member 62 differs from the support member 60 due to the orientation of the "indentation" of the arms 169, as shall become clear hereinafter.

The support member 62 has a substantially annular central portion 166 with an inner abutment face 172 adapted to abut against the outer abutment face 74 of the first support member 60, and an outer abutment face 174 adapted to abut against the third support member 64. The abutment faces 172 and 174 extend along respective radial planes P3 and P4, substantially perpendicular to the axis X (as can be seen in FIG. 9).

The arms 169 for supporting the sprockets 3 and 4 project radially from the substantially annular central portion 166 and have a coupling face 176 of the sprockets arranged between the planes P3 and P4. Alternatively, the coupling face 176 can be arranged in a position aligned with the plane P3 or even axially more inwardly, i.e. in a position even farther towards the inside from the plane P4. Opposite the coupling surface 176 there is a surface 178 axially more inwardly with respect to the plane P3.

In the illustrated example there are six support arms 169 and they are axially displaced by a predetermined amount towards the inside (i.e. in the direction I) with respect to the substantially annular central portion 166.

A through hole 180 crosses the opposite surfaces 176 and 178 for the canti-levered insertion of attachment elements 90, like for example rivets.

In particular, the attachment elements 90 project cantilevered from the coupling surfaces 176 and are intended to lock the sprockets 3 and 4 on the support member 62, as shall be described in detail hereinafter.

In addition, each arm 169 has, on the side of the coupling surface 176, an abutment surface 182 having generatrixes substantially parallel to the axis X to provide an additional support in the radial direction to the canti-levered attachment elements 90. Preferably, such an additional support surface 182 is a concave surface, even more preferably it is a cylindrical surface portion, however flat or convex surfaces are not excluded.

It should be observed that the arms 169 support at least two sprockets 3 and 4, arranged on the same side as the arms 169, with the sprocket 4 arranged in an axially more outer position than the sprocket 3 in the direction O. As illustrated in FIGS. 7 and 8, the sprockets 3 and 4 are thus supported by the arms 169 on the opposite side to that in which the sprockets 1 and 2 are supported by the arms 69, i.e. the engagement of the arms 169 is opposite that of the arms 69, so that the arms 69 and 169 at least partially cross over in the axial direction (as can be clearly seen in FIGS. 12 and 13).

On the radially inner edge of the substantially annular central portion 166 the same engagement profile 67 of the first support member 60 is reproduced, with the identical teeth 68 and the at least one different tooth 68a.

FIGS. 14 and 15 show the third support member 64 of the sprocket inwardly 16 of FIG. 2. In such a support member, elements equal or corresponding to those of the support member 60 are indicated with the same reference numeral increased by 200.

One of the main differences of this third member 64 compared to the other two is that it comprises just five support arms 269 for the coupling of the sprockets 5 and 6. Indeed, since sprockets 5 and 6 have a smaller diameter than sprockets 1-4, they need less strengthening and therefore a low number of fixing points to the support member 64 is sufficient.

Also the third support member 64 comprises a substantially annular central portion 266 with an inner abutment face 272, adapted to abut against the outer abutment face 174 of the second support member 62, and an outer abutment face 274, adapted to abut against a spacer 33 for separating from the sprocket 7. The abutment surfaces 272 and 274 extend along the radial planes P5 and P6, substantially perpendicular to the axis X (as can be seen in FIG. 9).

The arms 269 project radially from the substantially annular central portion 269 but in this case they are completely arranged between the planes P5 and P6. However, a variant of the third support member 64 described above, in which an "indentation" of the arms 269 is provided, for example similar to that of the arms 169, is not excluded.

The arms 269 also have a front surface 276 for coupling with the sprockets 5 and 6, crossed by a through hole 280 for the canti-levered insertion of attachment elements 90, like for example rivets.

In particular, the attachment elements 90 project cantilevered from the coupling surfaces 276 and are intended to lock the sprockets 5 and 6 on the support member 64, as shall be described in detail hereinafter.

In addition, each arm 269 has, on the side of the coupling surface 276, an abutment surface 282 having generatrixes extending substantially parallel to the axis X to provide an additional support in the radial direction to the cantilevered attachment elements 90. Preferably, such an additional support surface 182 is a concave surface, even more preferably it is a cylindrical surface portion, however flat or convex surfaces are not excluded.

The radially inner edge of the substantially annular central portion 266 comprises the same coupling profile 67 as the other two support members 60 and 62, i.e. it has the same identical teeth 68 and the different tooth 68a.

As illustrated in FIG. 16, by aligning the different teeth 68a of the support members 60, 62 and 64, the axes of the arms 69 and 169, and of the arms 169 and 269 respectively, are angularly staggered in the circumferential direction.

In particular, looking at the three support members 60, 62 and 64 thus arranged along an axial direction, the arms 69 and 169 are angularly staggered apart in a regular manner, whereas the arms 269 are angularly staggered with respect to the arms 169.

Moreover, the space 85 between two consecutive arms 69 is greater than or equal to the circumferential size of an arm 169, and vice-versa the space 86 between two consecutive arms 169 is greater than or equal to the circumferential size of an arm 69. In this way, the arms 169, thanks to their indentation, at least partially penetrate into the space 85 between the arms 69, and vice-versa, as can be seen more clearly in FIGS. 12 and 13, where the support members are illustrated in abutment in the same position that they take up in the mounted sprocket assembly 16. In other words, the arms 69 and 169 cross over in the axial direction. In FIG. 13 it is also clear that in the mounted condition the planes P2 and P3 coincide, as well as like the planes P4 and P5.

FIG. 9 shows the three support members 60, 62 and 64 facing one another in the position that they take up before being brought into abutment to form the configuration illustrated in FIGS. 12 and 13.

The sprockets 1-6, substantially shaped like a circular crown, comprise a plurality of radial extensions facing inwardly, each of such radial extensions comprising a through hole at positions that correspond to those of the through holes 80 (for sprockets 1 and 2), 180 (for sprockets 3 and 4) and 280 (for sprockets 5 and 6): the through holes of sprockets 1-6 are aligned with the through holes 80, 180 and 280 for coupling with the support members 60, 62 and 64 through the attachment elements 90.

In FIGS. 17 and 18, it is shown how, in the area between two consecutive radial extensions 3a of the sprocket 3, the arm 69 is partially housed in a cavity of the sprocket 3 itself: in particular, in the illustrated example, the aforementioned cavity is the cavity 87 defined on the inner profile of the sprocket 3 between two consecutive radial extensions 3a, and it crosses the entire thickness of the arm 69. Alternatively, the cavity can just occupy a portion of the entire thickness of the arm 69.

In other words, the sprocket 3 is at least partially arranged over the arm 69, i.e. in the aforementioned area between two radial extensions 3a the sprocket 3 is arranged outwardly with respect to the arm 69.

As shown in FIG. 7, the sprocket 2 is at least partially arranged over the arm 169 in a similar manner.

In FIG. 16 it can be seen that the arms 269 of the support member 64 have a shorter radial extension than that of the arms 69 and 169. Indeed, whilst the number of arms 269 is lower than that of arms 169 of the support member 62 and therefore the arms 269 cannot be regularly staggered with respect to the arms 169, the arms 269 must not completely shield the arms 169 in the axial direction, so that problems of interference with the arms 169 and the sprockets and/or attachment elements 90 mounted on the arms 169 are avoided. As can be seen in FIG. 2 in this way the sprocket 4 is at least partially arranged over the arms 269.

FIGS. 7 and 18 show the structural units 42 and 44 coupled together in the same configuration that they take up in the sprocket assembly 16.

The structural unit 42 comprises the support member 60 and the sprockets 1 and 2, fixedly connected thereto through the attachment element 90. Both of the sprockets 1 and 2 are supported on one side of the support member 60, in particular, they are arranged more inwardly with respect to the abutment plane P2 with the second support member 62, whereas the arms 69 are at least partially more outwardly with respect to such a plane.

The sprocket 2 is in abutment against the coupling surface 76 of the arms 69 and is kept in position by the attachment elements 90. The attachment elements 90 cross the sprocket 2 and extend cantilevered for supporting also the sprocket 1. Between the sprocket 1 and the sprocket 2 spacers 91 are arranged, which are an integral part of the attachment elements 90 and are sized so as to rest radially on the support surface 82. In this way, the only sprocket supported cantilevered is the sprocket 1, since the sprocket 2 is arranged between two areas of each attachment element resting at the support member 60. The sprocket 1, is also at least partially in a more inner position with respect to the abutment plane P1.

Similarly, the structural unit 44 comprises the second support member 62 and the sprockets 3 and 4 fixedly connected thereto. The abutment plane P3 coincides with the plane P2 and the sprockets 3 and 4 are supported in a more outer position with respect to such a plane whereas the arms 169 are arranged at least partially more inwardly with respect to such a plane. The sprocket 3 is directly in abutment on the coupling surface 176 held not cantilevered by the attachment elements 90a, since between the sprocket 3 and the sprocket 4 there are spacers 91, which are an integral part of the attachment elements 90 and are sized so as to rest radially on the support surface 182: the attachment elements 90 thus also rest on the support surface 182.

The sprocket 4, on the other hand, is supported cantilevered by an extension of the attachment elements 90 and is partially in a more outer position with respect to the abutment plane P4.

Thanks to the fact that the support members 60 and 62 are at least partially arranged over one another, there is at the same time a resistant section of the arms 69 and 169 that is sufficiently strong and an arrangement wherein the sprockets 1, 2, 3 and 4 are spaced apart at particularly small distances Z. In particular, with reference to FIG. 8, the sprocket 3 is at least partially arranged over the arms 69, so that they are at least partially arranged in the cavity 87 defined by the annular shape of the sprocket 3. The same occurs for the arms 169 and the sprocket 2. In this way the distance Z between the sprockets 2 and 3 can advantageously be lower than the thickness T of the arms 69 and 169.

As an example, the same distance Z has been illustrated between all of the pairs of sprockets, and in particular the spacers 91 have the same thickness as the distance Z between the sprockets 2 and 3. However, it is not excluded the possibility that this distance may vary from one pair of sprockets to the other. The values of the distances between consecutive sprockets, indeed, must take into account the thickness of the sprockets and of the chain intended to be used, to allow free engagement of the latter. Since the thickness of the sprockets can vary between sprockets having a greater diameter and sprockets having a smaller diameter, indicatively it is preferable to keep to consider combinations of thickness of sprockets and distances Z between sprockets such that their sum A is comprised in the range between 3-4.5 mm and even more preferably in the range between 3.5-4 mm.

FIGS. 19 and 20 show in detail the attachment element 90, which comprises a tubular body 94 and an intermediate portion projecting radially outwards 91 preferably made in one piece with the tubular body 94 and with the function of a spacer between two sprockets engaged by the same attachment element 90. The intermediate portion 91 has a circumferential lightening groove 92 on the outer edge thereof. Alternatively, the intermediate portion 91 can be made as a distinct piece from the tubular body 94.

The opposite ends 94*a* and 94*b* of the tubular body 94 can be folded, in the radial direction, in annular cavities 95*a* and 95*b* (FIG. 7) formed respectively on the inner face of the sprocket 1 and on the face 78 of the arm 69, about the through hole of the radial extension of the sprocket 1 and the through hole 80. The ends 94*a* and 94*b* have basically the same function as the ends of a rivet of the prior art.

As can be seen in FIG. 7, a similar attachment element 90 is used for the support member 62, orientated so that it is inverted with respect to the element 90 used for the support member 60, so that the opposite ends 94*b* and 94*a* of the tubular body 94 can be folded, in the radial direction, on the face 178 of the arm 169 and in an annular cavity 195*a* formed on the outer face of the sprocket 4, about the through hole of the radial extension of the sprocket 4.

As can be seen in FIG. 2, a similar attachment element 90 is also used for the support member 64, orientated like the element 90 used for the support member 60: the opposite ends 94*a* and 94*b* of the tubular body 94 can be folded, in the radial direction, on the inner face 278 of the arm 269 and in an annular cavity 295*a* formed on the outer face of the sprocket 6, around the through hole of the radial extension of the sprocket 6.

FIG. 21 shows a portion of a second embodiment of the assembly of toothed wheels according to the invention, which comprises a structural unit 552 that exactly corresponds to the assembly consisting of the two structural units 42 and 44, arranged side-by-side. In the structural unit 552, the support members 60 and 62 of the structural units 42 and 44 have been fused together in a support member 560, made in a single piece.

This support member 560 has arms 569*a* having a indentation towards the outside and corresponding to the arms 69 of the support member 60, and arms 569*b* having an indentation towards the inside and corresponding to the arms 169 of the support member 62. The sprockets 1 and 2 are both fixedly connected to just the arms 569*a* and both arranged on the inner side of such arms. Similarly, the sprockets 3 and 4 are both fixedly connected to just the arms 569*b* and both arranged on the outer side of such arms. In this way, the sprocket 3 is at least partially arranged over the arms 569*a* and the sprocket 2 is at least partially arranged over the arms 569*b*.

FIG. 22 illustrates a portion of a third embodiment of the assembly of toothed wheels according to the invention. In such an assembly, elements equal or corresponding to those of the support member 60 are indicated with the same reference numeral increased by 300.

The assembly of FIG. 22 comprises a structural unit 342 comprising a support member 360 to which a single sprocket 312 is connected, through a plurality of first rivets 390*a*. The support member 360 comprises a substantially annular central portion 366 and a plurality of arms 369 extending from it in the radial direction and having a shape and indentation similar to those of the arms 69 of the support member 60.

In this case, the indentation of the arms 369 is exploited to at least partially penetrate into at least one cavity 387 of a free sprocket 313, i.e. intended to be coupled directly with the hub of the bicycle, the free sprocket 313 being arranged at a side of the sprocket 312.

FIG. 23 illustrates a portion of a fourth embodiment of the assembly of toothed wheels according to the invention. In such an assembly, elements equal or corresponding to those of the support member 60 are indicated with the same reference numeral increased by 400.

The assembly of FIG. 23 comprises a structural unit 442 comprising a support member 460 to which a sprocket 412 is fixedly connected, through a plurality of first rivets 490*a*. The support member 460 comprises a substantially annular central portion 466 and a plurality of arms 469 extending from it in the radial direction and having a shape and indentation similar to those of the arms 69 of the support member 60.

In this case, the indentation of the arms 469 is exploited to at least partially penetrate into at least one cavity 487 of a sprocket 413. The sprocket 413 is arranged at a side of the outer abutment face 474 of the substantially annular central portion 466 and is connected thereto through a plurality of second rivets 490*b*.

In other words, the structural unit 442 thus comprises two sprockets 412 and 413 arranged on opposite sides of the support member 460 and fixedly connected thereto through rivets 490*a* and 490*b*, the arms 469 of the device at least partially penetrating into at least one cavity 487 of the sprocket 413.

Just for illustrative purposes an arm 469 has been shown that has an indentation towards the outside to penetrate into a more outer sprocket 413, however an opposite indentation to penetrate into a more inner sprocket 412 is not excluded.

Of course, a person of ordinary skill in the art can bring numerous modifications and variants to what has been described above purely as an example, in order to satisfy contingent and specific requirements, all of which are also covered by the scope of protection as defined by the following claims.

For example, all of the aforementioned detailed description has been made with reference to sprocket assemblies, but it is obvious that the toothed wheels of the assembly of the invention can also be the guide toothed wheels, mounted on the shaft of a bottom bracket assembly of a bicycle.

Moreover, it should be noted that, although all of the illustrated support members have five or six arms, this number of arms obviously is not restrictive and can vary from what has been illustrated.

What is claimed is:

1. Assembly of toothed wheels of a bicycle, comprising at least two toothed wheels of different diameter, a first annular support member fixed to a first toothed wheel of the at least two toothed wheels via a first fastener, the first annular support member is arranged coaxially on a component of the bicycle and supports the first toothed wheel of the at least two toothed wheels on the component of the bicycle, and the first annular support member and the first fastener are each at least partially-housed in at least one cavity of a second toothed wheel of the at least two toothed wheels, and a second annular support member is fixed to the second toothed wheel of the at least two toothed wheels and supports the second toothed wheel of the at least two toothed wheels on the component of the bicycle.

2. Assembly of toothed wheels according to claim 1, wherein the first annular support member comprises a first substantially annular central portion and a plurality of first arms extending radially outwards from the first substantially annular central portion, each of the first arms comprising at least one first through hole for housing the first fastener, each of the first arms being at least partially housed in a respective cavity of the second toothed wheel.

3. Assembly of toothed wheels according to claim 2, wherein each of the first arms is axially displaced by a predetermined amount, with respect to the first substantially annular central portion, towards the second toothed wheel.

4. Assembly of toothed wheels according to claim 2, wherein the first toothed wheel comprises a plurality of first radial extensions facing inwardly, each of the first radial extensions comprising at least one second through hole aligned with the at least one first through hole for coupling with the first annular support member through the first fastener.

5. Assembly of toothed wheels according to claim 4, comprising a third toothed wheel having a diameter different to that of the first toothed wheel and associated with the first annular support member on a same side as the first toothed wheel and in a more axially inner position with respect to the first toothed wheel, the third toothed wheel being at a predetermined distance from the first toothed wheel, and the third toothed wheel includes at least one third through hole aligned with the at least one first and second through holes for coupling with the first annular support member and with the at least one first toothed wheel through the first fastener.

6. Assembly of toothed wheels according to claim 5, wherein the second annular support member comprises a second substantially annular central portion in abutment against the first substantially annular central portion at a first abutment plane and a plurality of second arms extending radially outwards from the second substantially annular central portion, each of the second arms comprising at least one fourth through hole for housing a respective second fastener, each of the second arms being at least partially housed in a respective cavity of the first toothed wheel, the first arms being angularly staggered with respect to the second arms in a circumferential direction.

7. Assembly of toothed wheels according to claim 6, wherein each of the second arms is axially displaced by a predetermined amount, with respect to the second substantially annular central portion, towards the first toothed wheel, and the second toothed wheel is arranged on an opposite side to the first toothed wheel with respect to the first abutment plane.

8. Assembly of toothed wheels according to claim 6, wherein the second toothed wheel comprises a plurality of second radial extensions facing inwardly, each of the second radial extensions comprising at least one fifth through hole aligned with the at least one fourth through hole for coupling with the second annular support member through the second fastener.

9. Assembly of toothed wheels according to claim 6, wherein the second fastener comprises a substantially tubular body at least partially housed in a respective fourth hole and an intermediate portion projecting radially outwards and acting in abutment against the second toothed wheel on the opposite side to the second arm.

10. Assembly of toothed wheels according to claim 9, comprising a fourth toothed wheel having a diameter different to that of the second toothed wheel and associated with the second annular support member on a same side as the second toothed wheel and in a more axially outer position with respect to the second toothed wheel, the fourth toothed wheel being at a predetermined distance from the second toothed wheel, and wherein the fourth toothed wheel comprises a plurality of sixth through holes aligned with the at least one fourth through hole and at least one fifth through hole for coupling with the first annular support member and with the second toothed wheel through the second fastener, wherein the intermediate portion is operatively arranged between the fourth toothed wheel and the second toothed wheel.

11. Assembly of toothed wheels according to claim 9, wherein the intermediate portion is circumferentially grooved.

12. Assembly of toothed wheels according to claim 9, wherein each of the second arms comprises an abutment surface having generatrixes substantially parallel to a rotation axis of the assembly and acting in abutment on the intermediate portion and on the second toothed wheel.

13. Assembly of toothed wheels according to claim 6, comprising a fourth toothed wheel having a diameter different to that of the second toothed wheel and associated with the second annular support member on a same side as the second toothed wheel and in a more axially outer position with respect to the second toothed wheel, the fourth toothed wheel being at a predetermined distance from the second toothed wheel.

14. Assembly of toothed wheels according to claim 13, wherein the second toothed wheel comprises a plurality of second radial extensions facing inwardly, each of the second radial extensions comprising at least one fifth through hole aligned with the at least one fourth through hole for coupling with the second annular support member through the second fastener, and the fourth toothed wheel comprises a plurality of sixth through holes each aligned with the fourth and fifth through holes for coupling with the second annular support member and with the second toothed wheel through the second fastener.

15. Assembly of toothed wheels according to claim 13, comprising a third annular support member that supports a fifth toothed wheel that comprises a third substantially annular central portion in abutment against the second substantially annular central portion on the opposite side to the first substantially annular central portion at a second abutment plane.

16. Assembly of toothed wheels according to claim 15, wherein the second toothed wheel comprises a plurality of second radial extensions facing inwardly, each of the second radial extensions comprising at least one fifth through hole aligned with the at least one fourth through hole for coupling with the second annular support member through the second fastener, the fourth toothed wheel comprises a plurality of sixth through holes aligned with the fourth and fifth through holes for coupling with the first annular support member and with the second toothed wheel through the second fastener, and the third annular support member comprises a plurality of third arms extending radially outwards from the third substantially annular central portion, each of the third arms comprising at least one seventh through hole for housing a respective third fastener, each of the third arms being at least partially housed in a respective cavity of a toothed wheel supported by the second annular support member.

17. Assembly of toothed wheels according to claim 16, wherein the third arms are angularly staggered with respect to the second arms in a circumferential direction.

18. Assembly of toothed wheels according to claim 16, wherein the fifth toothed wheel comprises a plurality of third radial extensions facing inwardly, each of the third radial extensions comprising at least one eighth through hole aligned with the at least one seventh through hole for coupling the fifth toothed wheel with the third annular support member.

19. Assembly of toothed wheels according to claim 18, comprising a sixth toothed wheel having a diameter different to that of the fifth toothed wheel and associated with the third annular support member on the same side as the fifth toothed wheel and in a more axially outer position with respect to the fifth toothed wheel, the sixth toothed wheel being at a predetermined distance from the fifth toothed wheel, wherein the sixth toothed wheel comprises a plurality of ninth through holes aligned with the seventh and eighth through holes for coupling with the third annular support member and with the fifth toothed wheel.

20. Assembly of toothed wheels according to claim 16, the third fastener comprises a substantially tubular body at least partially housed in a respective seventh hole and an intermediate portion projecting radially outwards and acting in abutment against the fifth toothed wheel on the opposite side to the third arm.

21. Assembly of toothed wheels according to claim 20, wherein the intermediate portion is operatively arranged between the sixth toothed wheel and the fifth toothed wheel.

22. Assembly of toothed wheels according to claim 20, wherein the intermediate portion is circumferentially grooved.

23. Assembly of toothed wheels according to claim 20, wherein each of the third arms comprises an abutment surface having generatrixes substantially parallel to a rotation axis of the assembly and acting in abutment on the intermediate portion and on the fifth toothed wheel.

24. Assembly of toothed wheels according to claim 16, wherein the third fastener is substantially the same as the first and second fastener.

25. Assembly of toothed wheels according to claim 16, wherein the number of the third arms is lower than that of the first and second arms.

26. Assembly of toothed wheels according to claim 16, wherein the third arms have a radial extension shorter than that of the first and second arms.

27. Assembly of toothed wheels according to claim 15, wherein the fifth toothed wheel is arranged on the opposite side to the second toothed wheel with respect to the second abutment plane.

28. Assembly of toothed wheels according to claim 15, comprising a sixth toothed wheel having a diameter different to that of the fifth toothed wheel and associated with the third annular support member on the same side as the fifth toothed wheel and in a more axially outer position with respect to the fifth toothed wheel, the sixth toothed wheel being at a predetermined distance from the fifth toothed wheel.

29. Assembly of toothed wheels according to claim 6, wherein the second fastener comprises a substantially tubular body at least partially housed in a respective fourth hole and an intermediate portion projecting radially outwards and acting in abutment against the second toothed wheel on the opposite side to the second arm.

30. Assembly of toothed wheels according to claim 29, comprising a fourth toothed wheel having a diameter different to that of the second toothed wheel and associated with the second annular support member on a same side as the second toothed wheel and in a more axially outer position with respect to the second toothed wheel, the fourth toothed wheel being at a predetermined distance from the second toothed wheel, and
    wherein the second toothed wheel comprises a plurality of second radial extensions facing inwardly, each of the second radial extensions comprising at least one fifth through hole aligned with the at least one fourth through hole for coupling with the second annular support member through the second fastener, and the fourth toothed wheel comprises a plurality of sixth through holes each aligned with the fourth and fifth through holes for coupling with the second annular support member and with the second toothed wheel through the second fastener, wherein the intermediate portion is operatively arranged between the fourth toothed wheel and the second toothed wheel.

31. Assembly of toothed wheels according to claim 29, wherein the intermediate portion is circumferentially grooved.

32. Assembly of toothed wheels according to claim 29, wherein each of the second arms comprises an abutment surface having generatrixes substantially parallel to a rotation axis of the assembly and acting in abutment on the intermediate portion and on the second toothed wheel.

33. Assembly of toothed wheels according to claim 6, wherein the second fastener is substantially the same as the first fastener.

34. Assembly of toothed wheels according to claim 6, wherein the number of the second arms and the first arms is the same.

35. Assembly of toothed wheels according to claim 5, wherein the second annular support member also comprises a plurality of second arms extending radially outwards from a second substantially annular central portion, each of the second arms comprising at least one fourth through hole for housing a respective second fastener to the second toothed wheel, each of the second arms being at least partially housed in a respective cavity of the first toothed wheel.

36. Assembly of toothed wheels according to claim 35, wherein the second toothed wheel comprises a plurality of second radial extensions facing inwardly, each of the second radial extensions comprising at least one fifth through hole aligned with the at least one fourth through hole for coupling with the second annular support member through the second fastener.

37. Assembly of toothed wheels according to claim 5, comprising a fourth toothed wheel having a diameter different to that of the second toothed wheel and associated with the first annular support member on the same side as the second toothed wheel and in a more axially outer position with respect to the second toothed wheel, the fourth toothed wheel being at a predetermined distance from the second toothed wheel.

38. Assembly of toothed wheels according to claim 37, wherein the second toothed wheel comprises a plurality of second radial extensions facing inwardly, each of the second radial extensions comprising at least one fifth through hole aligned with at least one fourth through hole for coupling with the second annular support member through the second fastener, wherein the fourth toothed wheel comprises a plurality of sixth through holes aligned with the fourth and fifth through holes for coupling with the first annular support member and with the second toothed wheel through the second fastener.

39. Assembly of toothed wheels according to claim 2, wherein the first fastener comprises a substantially tubular body at least partially housed in a respective first hole and an intermediate portion projecting radially outwards and acting in abutment against the first toothed wheel on an opposite side to the first arm.

40. Assembly of toothed wheels according to claim 39, wherein the intermediate portion is circumferentially grooved.

41. Assembly of toothed wheels according to claim 39, wherein each of the first arms comprises an abutment surface having generatrixes substantially parallel to a rotation axis of the assembly and acting in abutment on the intermediate portion and on the first toothed wheel.

42. Assembly of toothed wheels according to claim 2, wherein the second toothed wheel is associated with the first annular support member.

43. Assembly of toothed wheels according to claim 42, wherein the second toothed wheel is associated with the first annular central portion of the first annular support member.

44. Assembly of toothed wheels according to claim 43, wherein the second toothed wheel is connected to the first annular central portion through riveting.

45. Assembly of toothed wheels according to claim 2, comprising a lightening throat formed at a base of each arm.

46. Assembly of toothed wheels according to claim 1, wherein the at least one cavity entirely spans the thickness of the respective toothed wheel.

47. Assembly of toothed wheels according to claim 1, wherein there are a plurality of the cavities and they are substantially equally spaced apart circumferentially.

48. Assembly of toothed wheels according to claim 1, wherein the toothed wheels are sprockets of a rear wheel of a bicycle and the component is a free body of a hub of the rear wheel of the bicycle.

49. Assembly of toothed wheels according to claim 48, wherein the first annular support member comprises a radially inner surface having a profile adapted to transmit a torque to the free body.

50. Assembly of toothed wheels according to claim 49, wherein the surface is a grooved surface.

51. Assembly of toothed wheels according to claim 49, wherein the profile comprises a plurality of teeth of the same shape and at least one tooth of a different shape.

52. Assembly of toothed wheels according to claim 1, wherein a thickness of the first toothed wheel and a distance between the at least two toothed wheels are selected so that their sum is comprised between 3 mm and 4.5 mm.

53. Assembly of toothed wheels according to claim 1, wherein a thickness of the first toothed wheel and a distance between the at least two toothed wheels are selected so that their sum is comprised between 3.5 and 4 MM.

54. Assembly of toothed wheels according to claim 1, wherein the toothed wheels are guide toothed wheels of a bicycle and the component is a shaft of a bottom bracket assembly of the bicycle.

55. Sprocket assembly comprising at least one assembly of toothed wheels according to claim 1.

56. Sprocket assembly according to claim 55, comprising at least one free toothed wheel, adapted to be directly coupled with the component of the bicycle.

57. Bicycle comprising at least one assembly of toothed wheels according to claim 1.

58. An assembly of toothed wheels of a bicycle, comprising:
at least a first toothed wheel, a second toothed wheel, and a third toothed wheel, the first toothed wheel, second toothed wheel, and third toothed wheel having different diameters; and,
a first annular support member fixed to the first and third toothed wheels via a first fastener, said first annular support member supports the first and third toothed wheels on a component of the bicycle and is arranged coaxially on the component of the bicycle, and the first annular support member and the first fastener are each at least partially housed in a cavity formed in the second toothed wheel, a second annular support member is fixed to the second toothed wheel which is supported on the component of the bicycle by the second annular support member.

59. An assembly of toothed wheels of a bicycle, comprising at least two toothed wheels of different diameter, and a first annular support member fixed to a first toothed wheel of the at least two toothed wheels via a first fastener and supports the first toothed wheel of the at least two toothed wheels on a component of the bicycle, the first annular support member is arranged coaxially on the component of the bicycle and has an arm extending from an annular central portion, wherein the arm and the first fastener are each at least partially housed in at least one cavity of a second toothed wheel of the at least two toothed wheels and the second toothed wheel is fixed to a second annular support member and is supported on the component of the bicycle by the second annular support member.

60. Assembly of toothed wheels of a bicycle, comprising at least three toothed wheels of different diameter and a first annular support member fixed to a first and a third toothed wheel of the at least three toothed wheels via a first fastener, and supports the first and third toothed wheels of the at least three toothed wheels on a component of the bicycle, the first annular support member being arranged coaxially on the component of the bicycle, wherein the first annular support member and the first fastener are each at least partially-housed in at least one cavity of a second toothed wheel of the at least three toothed wheels and the second toothed wheel is fixed to a second annular support member and is supported on the component of the bicycle by the second annular support member.

61. Assembly of toothed wheels of a bicycle, comprising at least two toothed wheels of different diameter and a first annular support member fixed to a first toothed wheel of the at least two toothed wheels via a first fastener, supports the first toothed wheel of the at least two toothed wheels on a component of the bicycle, and is arranged coaxially on the component of the bicycle, wherein the first annular support member and the first fastener are each at least partially-housed in at least one cavity of a second toothed wheel of the at least two toothed wheels and the second toothed wheel is fixed to a second annular support member and is supported on the component of the bicycle by the second annular support member, the second annular support member being coaxially arranged on the component of the bicycle, wherein the first annular support member comprises a first substantially annular central portion and a plurality of first arms extending radially outwards from the first substantially annular central portion, each of the first arms comprising at least one first through hole for housing the first fastener, each of the first arms being at least partially housed in the cavity of the second toothed wheel, the assembly comprising a third toothed wheel having a diameter different to that of the first toothed wheel and associated with the first annular support member on the same side as the first toothed wheel and in a more axially inner position with respect to the first toothed wheel, the third toothed wheel being at a predetermined distance from the first toothed wheel, wherein the first toothed wheel comprises a plurality of first radial extensions facing inwardly, each of the first radial extensions comprising at least one second through hole aligned with the at least one first through hole for coupling with the first annular support member through the first fastener, wherein the third toothed wheel comprises a plurality of third through holes each aligned with the first and second through holes for coupling with the first annular support member and with the at least one first toothed wheel through the first fastener.

62. Assembly of toothed wheels of a bicycle, comprising at least two toothed wheels of different diameter and a first annular support member fixed to a first toothed wheel of the at least two toothed wheels via a first fastener, and supports the first toothed wheel of the at least two toothed wheels on a component of the bicycle, the first annular support member is arranged coaxially on the component of the bicycle, wherein the first annular support member and the first fastener are each at least partially-housed in at least one cavity of a second toothed wheel of the at least two toothed wheels and the second toothed wheel of the at least two toothed wheels is fixed to a second annular support member and is supported on the component of the bicycle by the second annular support member, the second annular support member being coaxially arranged on the component of the bicycle, wherein the first annular support member comprises a first substantially annular central portion and a plurality of first arms extending radially outwards from the first substantially annular central portion, each of the first arms comprising at least one first through hole for housing the first fastener, each of the first arms being at least partially housed in the cavity of the second toothed wheel, wherein each respective first fastener comprises a substantially tubular body at least partially housed in a respective first hole and an intermediate portion projecting radially outwards and in abutment against the first toothed wheel on an opposite side to the first arm, wherein the first toothed wheel comprises a plurality of first radial extensions facing inwardly, each of the first radial extensions comprising at least one second through hole aligned with the at least one first through hole for coupling with the first annular support member through the first fastener, said assembly comprising a third toothed wheel having a diameter different to that of the first toothed wheel and associated with the first annular support member on the same side as the first toothed wheel and in a more axially inner position with respect to the first toothed wheel, the third toothed wheel being at a predetermined distance from the first toothed wheel, and the third toothed wheel comprises a plurality of third through holes aligned with the first and second through holes for coupling with the first annular support member and with the first toothed wheel through the first fastener, wherein the intermediate portion is operatively arranged between the third toothed wheel and the first toothed wheel.

\* \* \* \* \*